(12) United States Patent
Francis et al.

(10) Patent No.: US 6,182,092 B1
(45) Date of Patent: Jan. 30, 2001

(54) METHOD AND SYSTEM FOR CONVERTING BETWEEN STRUCTURED LANGUAGE ELEMENTS AND OBJECTS EMBEDDABLE IN A DOCUMENT

(75) Inventors: James Lee Francis, Carnation; Frank Mantek, Issaquah; Andrew Layman, Bellevue; Robert A. Little; Darren Alexander Apfel, both of Redmond, all of WA (US)

(73) Assignee: Microsoft Corporation, Redmond, WA (US)

( * ) Notice: Under 35 U.S.C. 154(b), the term of this patent shall be extended for 0 days.

(21) Appl. No.: 08/892,579

(22) Filed: Jul. 14, 1997

(51) Int. Cl.7 .................................................... G06F 17/30
(52) U.S. Cl. ............................................................ 707/513
(58) Field of Search ............................... 707/101, 1, 100, 707/103, 513

(56) References Cited

U.S. PATENT DOCUMENTS

| | | | |
|---|---|---|---|
| 5,210,824 | * | 5/1993 | Putz et al. ............................... 707/523 |
| 5,506,985 | * | 4/1996 | Motoyama et al. .................... 707/523 |
| 5,553,216 | * | 9/1996 | Yoshioka et al. ...................... 707/515 |
| 5,706,434 | * | 1/1998 | Kremen et al. ........................ 709/218 |
| 5,802,529 | * | 9/1998 | Nakatsuyama et al. ............... 707/513 |
| 5,848,415 | * | 12/1998 | Guck ....................................... 707/10 |
| 5,890,171 | * | 3/1999 | Blumer et al. ......................... 707/501 |
| 5,920,879 | * | 6/1999 | Kyojima et al. ....................... 707/517 |
| 5,991,782 | * | 11/1999 | Miyagawa et al. .................... 707/513 |

OTHER PUBLICATIONS

Chappell, David, *Understanding ActiveX and OLE*, Microsoft Press, Jun. 1996, pp. 107–128.
*Microsoft Internet Assistant for Word 6.0 for Windows*, Microsoft, 1995.

* cited by examiner

Primary Examiner—Joseph H. Feild
Assistant Examiner—Robert D. Bourque
(74) Attorney, Agent, or Firm—Klarquist Sparkman Campbell Leigh & Whinston, LLP

(57) ABSTRACT

A converter converts between structured language elements and objects embeddable in the native format of a document editor. A data structure representing the embeddable object is created without instantiating an instance of the object and includes the associated structured language element. Subsequently, the structured language element is used to instantiate an object and set its properties. Any portion of the structured language element not recognized during the conversion process is retained by the embeddable object. If conversion back to a structured language element is subsequently required, the conversion process is facilitated by the presence of the original structured language element within the embeddable object as well as the retained portion of the structured language element not recognized.

17 Claims, 19 Drawing Sheets

```
<HTML>
<HEAD>
<TITLE>SAMPLE</TITLE>
</HEAD>
<BODY>
<MARQUEE BEHAVIOR="ALTERNATE" WIDTH="764"
HEIGHT="27" GIBBER="important">
Sample Text
</MARQUEE>
<B><P>The form follows this line: </P></B>
<FORM ACTION="http://a.b.c/xyz.cgi" METHOD="post">
<P>
Please enter a choice:
<INPUT TYPE="TEXT" MAXLENGTH="25"
NAME="CHOICE">
</P>
<P>
<INPUT TYPE="submit" NAME="OK">
<INPUT TYPE="reset">
</P></FORM></BODY>
</HTML>
```

Sample Text

The form follows this line:

Please enter a choice: [    ]

[ SUBMIT ] [ RESET ]

METHOD AND SYSTEM FOR CONVERTING BETWEEN STRUCTURED LANGUAGE ELEMENTS AND OBJECTS EMBEDDABLE IN A DOCUMENT

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to document format conversion. More particularly, the invention relates to converting between a structured language element and an object embeddable in the native format of a document editor.

BACKGROUND AND SUMMARY OF THE INVENTION

Electronic documents may be composed according to a variety of document formats which differ in the way they represent a document. For example, two documents in two different formats may appear similar when displayed to the user. However, the internal representations of the documents may be very different. Since a document editor is typically able to load and save only those documents of a particular format (i.e., the document editor's "native" format), a common problem related to document formats is converting documents from one document format to another.

A particular type of document format is referred to herein as a structured language. Structured languages use plain text to denote how a document should be formatted and to indicate items within the document. Particular structured languages such as the Hypertext Markup Language (HTML) and the Virtual Reality Modeling Language (VRML) are widely used on the Internet, a world-wide network of cooperating computer networks. However, structured languages can also be used for non Internet purposes.

HTML comprises plain text and HTML tags, the latter of which are comprised of HTML tag components (e.g., an HTML tag name, HTML attribute keyword or HTML attribute value). One function of the HTML tags is to format and organize the text of an HTML document. Another function of the HTML tags is to denote items within the HTML document. For example, a particular item called a hyperlink provides a link to another document and is denoted by a particular HTML tag. Hyperlinks can be thought of as cross references connecting HTML documents to facilitate traversal from one HTML document to another. As a result, a certain collection of interconnected HTML documents available on the Internet is often referred to as the World Wide Web (WWW). Although widely used on the Internet, HTML can also be used on non-networked machines or on intranets (networks separate from the Internet using Internet standards).

The text in an unrendered HTML document is sometimes referred to as "source" or "raw" HTML. Ordinarily, such source HTML is not viewed without the aid of an HTML document viewer (commonly called a web browser). The HTML document viewer interprets the unrendered HTML text to provide the user with a rendered HTML document. For example the "<B>" HTML tag causes text associated with it to appear in boldface type, and the "<HR>" HTML tag results in a horizontal rule. HTML includes numerous other tags to represent headings, numbered lists, and other items. Commercially available HTML document viewers include the Internet Explorer by Microsoft Corporation of Redmond, Washington, Netscape Navigator by Netscape Communications Corporation of Mountain View, Calif., and Mosaic by the National Center for Supercomputer Applications (NCSA) of Champaign-Urbana, Ill.

Originally, HTML consisted of only text and text-related tags. The limitations of a text only system were recognized, and new HTML tags were added to define images, forms, tables, and other items. As other limitations in existing tags are recognized, HTML is extended and enhanced. For example, new HTML tags are added, or existing tags are redefined. As a result, the definitions of HTML tags may change over time, and the rendering process evolves to accommodate the changes.

One or more HTML tags can be used to construct an HTML element. Certain HTML elements relating to forms are particularly useful because they can be used to collect information from users. For example, when the HTML document is rendered, an HTML element may appear as a text box or a graphical push button. A user can place identifying or search information in the text box and click on the push button (i.e., activate a user input device such as a mouse while pointing at the graphical push button) to send the information to a vendor. Such an arrangement has numerous uses, including conducting business over the Internet (e.g., using an HTML order form document), performing operations on non-networked computers (e.g., using an HTML form to search a database of personal contact information), or gathering information over an intranet (e.g., using an HTML form to collect information from a new employee).

A recurring problem associated with HTML is finding a convenient way to create and edit HTML documents. Many of the more powerful document editors (e.g., word processor, spreadsheet, or presentation programs) include a large set of useful features for editing and publishing a variety of documents, such as WYSIWYG (What-You-See-Is-What-You-Get) editing, spell checking, and extensive on-line help. Document editors such as Microsoft Word 95 and Microsoft Excel 95 by Microsoft Corporation of Redmond, Wash., offer these and many other useful features.

In addition, many document editors allow certain items to be embedded into documents. For instance, a word processor may permit an image or a video to be inserted into a text document. A certain item called an object may be embedded in a document if it is of a format recognized by the document editor as embeddable. Examples of embeddable objects are text boxes, pick lists, and graphical push buttons. A class identifier is used to identify like objects of a particular class.

Once embedded in the document, some document editors allow the user to manipulate the object within the document. For example, text boxes, pick lists, and graphical push buttons may be placed within a document to create a form. A user may define the appearance and behavior of the embedded objects by setting their properties. For example, Microsoft Forms[3] by Microsoft Corporation provides the user with classes of objects relating to text boxes, push buttons, and other items that can be embedded in Microsoft Word 95 documents. Thus, the user may employ these document editors with embeddable object capability to create and edit forms.

However, using these editors to edit HTML documents presents two basic problems. First, the format these editors use to load or save documents (hereafter their "native" format) is typically not HTML, so the editors do not offer a way to create or edit rendered HTML documents. In other words, a document saved in the native format of one of these editors is typically not saved according to the HTML specification.

The second problem relates to embedding HTML into a document. Although some document editors allow items of various formats to be embedded into documents, HTML is generally not recognized as an embeddable format. In other words, document editors generally do not permit HTML elements to be embedded into a document.

Some document editors address the first problem by offering a mechanism for converting between the editor's native format and HTML, called a converter. However, these converters typically convert only a subset of the possible HTML tags and elements, such as simple ones relating to formatting and hyperlinks. In this way, the user can take advantage of the features within the document editor to edit some HTML documents and need not use a separate application to edit HTML documents. However, more complex HTML elements, such as those relating to forms cannot be converted to simple formatting or a hyperlink. Further, the second problem relating to the non-embeddable nature of HTML prevents such a simple converter from simply placing these HTML elements into a document.

To solve the conversion problem, a comprehensive program could be constructed to convert between an HTML document and a document in a particular native document format. For example, the Internet Assistant by Microsoft Corporation provides users with an HTML conversion software routine for Microsoft Word 95. A problem facing these programs is that the HTML-to-native document format converter must be able to convert a wide variety of HTML elements into the native document format. In addition, each of the HTML tag components may affect the conversion process. Further, the native document format may not include features that fully represent the HTML elements. Therefore, additional data must be associated with the native document features and additional logic must be included in the document editor to handle the additional data. The logic required to implement such a process can be relatively complex. Finally, if the HTML elements cannot be fully represented by native document features, the document editor may not provide WYSIWYG editing of the converted document.

The native document format-to-HTML converter faces similar problems because it requires logic to convert the native document format into a wide variety of HTML elements. Thus, a comprehensive converter becomes quite large and complex. In addition, when HTML is converted into a native document format and subsequently converted back into HTML, the resulting HTML may not be identical to the original HTML, due to idiosyncrasies of the conversion process. Finally, as HTML evolves, such a converter falls quickly into obsolescence, and the additional logic included in the document editor must be changed.

Several document editors bypass the problems associated with conversion and use HTML as their native format, allowing users to directly edit rendered HTML. Examples of these HTML editors include FrontPage by Microsoft Corporation, Netscape Navigator Gold by Netscape Communications Corporation, and HoTMetaL by SoftQuad Incorporated of Toronto, Canada. However, these specialized programs have their own drawbacks. They contain a reduced set of features compared to other document editors, and a new version of the editor must be provided when new HTML extensions or enhancements are added.

Another way to address the problems associated with conversion is to edit the source HTML without rendering it. A document editor may offer a way to manipulate plain text. If so, the editor may be used to open, save, edit, or create source HTML without rendering it. However, such an approach is problematic because the user cannot see how the HTML viewer will ultimately render the HTML. For example, the user may see the unrendered HTML element for a graphical push button (e.g., <INPUT TYPE="reset">) but cannot see where the push button will be placed or how it will appear when rendered. As a result, the user cannot perform WYSIWYG editing, and the editing process is often slowed by repeated switching between editing the source HTML with a document editor and viewing the rendered HTML with an HTML viewer. Forms are challenging to edit in any environment, and the inability to easily see the form compounds the difficulty.

Thus, users who wish to create or edit HTML documents containing certain HTML elements, such as those relating to forms, have been forced to choose among three undesirable situations: writing a comprehensive converter program with its associated problems, using a specialized HTML editor with limited features, or editing source HTML by switching back and forth between programs.

The present invention provides methods and systems for converting between a structured language document and a document of a native format while avoiding these problems. Conversion between structured language elements and objects embeddable in the native format of a document editor is provided. Thus the user is not required to use a separate, specialized program and can take advantage of the features in a document editor that does not use the structured language as its native format (e.g., a non-HTML document editor) and does not recognize the structured language as an embeddable format.

In one implementation, a method is provided for converting a structured language element to an object of an embeddable format recognized by the document editor. A converter first converts a structured language document to a stream in a format called Rich Text Format (hereinafter "RTF"). When a structured language element is encountered in the structured language document, a class identifier identifying an object of a format embeddable in the document editor is selected according to a selected tag component (e.g., an HTML tag name) of the structured language element with reference to a Structured Language Element-to-Embeddable Object Class Association Table. Then, the class identifier and the structured language element are placed into a storage. The storage is converted into a stream, and the stream is placed into the RTF stream. The converter does not instantiate an embeddable object during the conversion process or set the embeddable object's properties. In this way, the converter logic is kept small and need not be repeatedly updated with each change in the structured language. If new structured elements are created, a new Structured Language Element-to-Embeddable Object Class Association Table can be provided instead of providing a new converter. Another advantage to this arrangement is that some document editors already have a facility for converting RTF to their native format.

In another aspect of the invention, the streams relating to embeddable objects in the RTF stream described above are converted into storages, each storage containing a class identifier and a structured language stream. When the embeddable object relating to the storage is to be displayed, the storage is used to instantiate an embeddable object of the class identified by the class identifier in the storage. The structured language stream is passed to the embeddable object using an interface to the object, and the structured language stream is stored within the embeddable object. An advantage to this arrangement is that a document editor may already have a facility for determining when an item is to be displayed and can already instantiate an object if provided an appropriate storage. Thus, this aspect of the invention has the advantage of providing an appropriate storage for instantiating the embeddable object without instantiating an object to produce the storage.

In another aspect of the invention, the structured language stream within the embeddable object is used to set the properties of the embeddable object. A property setting software routine is included in the document editor. The embeddable object provides the structured language stream and a Structured Language Attribute-to-Embeddable Object Property Association Table to the property setting software routine, which parses the structured language and sets the appropriate embeddable object properties according to the structured language stream. In this way, the embeddable object avoids containing certain logic for parsing the structured language because the property setting software routine handles the details of parsing the structured language with reference to the Structured Language Attribute-to-Embeddable Object Property Association Table. In this way, the size of the embedded object is reduced, and structured language extensions or enhancements can be processed by providing a new Table.

In another aspect of the invention, the property setting software routine stores a "found" value within the embeddable object indicating which of the properties were set with reference to the Structured Language Attribute-to-Embeddable Object Property Association Table. If the property setting software routine encounters a portion of the structured language stream that it is unable to process, it stores the portion separately within the embeddable object. The information relating to which of the properties were set and which portions of the structured language could not be processed is used if the embeddable object is later converted back into the structured language. In this way, idiosyncrasies of the conversion process are avoided, and the resulting structured language more closely resembles the original structured language, even if not recognized during the property setting process.

In the case of an HTML document, since the HTML elements (e.g., such as those relating to forms) in the HTML document are converted to objects embeddable by a non-HTML document editor, the user can use the numerous features available within the non-HTML document editor. Since the embeddable object handles some of the details of the HTML to embeddable object conversion, the same conversion logic may be used to process HTML streams containing new extensions or enhancements. If the details of the conversion process change due to new HTML extensions or enhancements, changes to the conversion process can be effected by providing a new embeddable object class (which may contain a new Structured Language Attribute-to-Embeddable Object Property Association Table). A mechanism for providing a new embeddable object class already exists, so the invention facilitates converting new HTML extensions or enhancements.

Other aspects of the invention relate to converting an embeddable object into a related structured language element. The embeddable object provides a stream of the structured language through an interface. If no changes have been made to the embeddable object since the structured language stream was stored in it, the embeddable object uses the stored structured language stream. Using the stored stream facilitates the conversion process and results in a structured language stream closely resembling (or identical to) the original.

If there have been changes to the embeddable object, or if no structured language stream is present within the embeddable object, a property saving software routine is provided by the document editor to assist the embeddable object in producing a structured language stream. The property saving software routine uses the Structured Language Attribute-to-Embeddable Object Property Association Table and the "found" value described above to generate a stream of the structured language relating to the embeddable object. The property saving software routine also retrieves any portion of structured language not recognized that was stored within the embeddable object. Thus, the embeddable object can use the property saving software routine to assist it in generating a stream of the structured language. In this way, the embeddable object avoids containing certain logic for generating a stream of the structured language. As a result, the size of the embeddable object is reduced.

In addition, using the "found" value and the portion of structured language not recognized results in a structured language element more closely resembling (or identical to) the original one.

Additional features and advantages of the invention will be made apparent from the following detailed description of an illustrated embodiment which proceeds with reference to the accompanying drawings.

BRIEF DESCRIPTION OF THE DRAWINGS

FIG. 3A is a view of an unrendered HTML document, such as that of FIG. 2.

FIG. 3B is a view of the HTML document of FIG. 3A in rendered form.

DETAILED DESCRIPTION OF THE ILLUSTRATED EMBODIMENTS

The present invention is directed toward methods and systems for converting between a structured language element (e.g., an HTML element) and an embeddable object. In one embodiment, the invention is incorporated into a word processing application program entitled "Microsoft Word 97," marketed by Microsoft Corporation of Redmond, Wash. Microsoft Word 97 provides a means for creating, editing, and saving documents in a word processing environment and includes a rich set of features such as WYSIWYG editing, spell checking, and an extensive on-line help facility.

Exemplary Operating Environment

Figure 1:
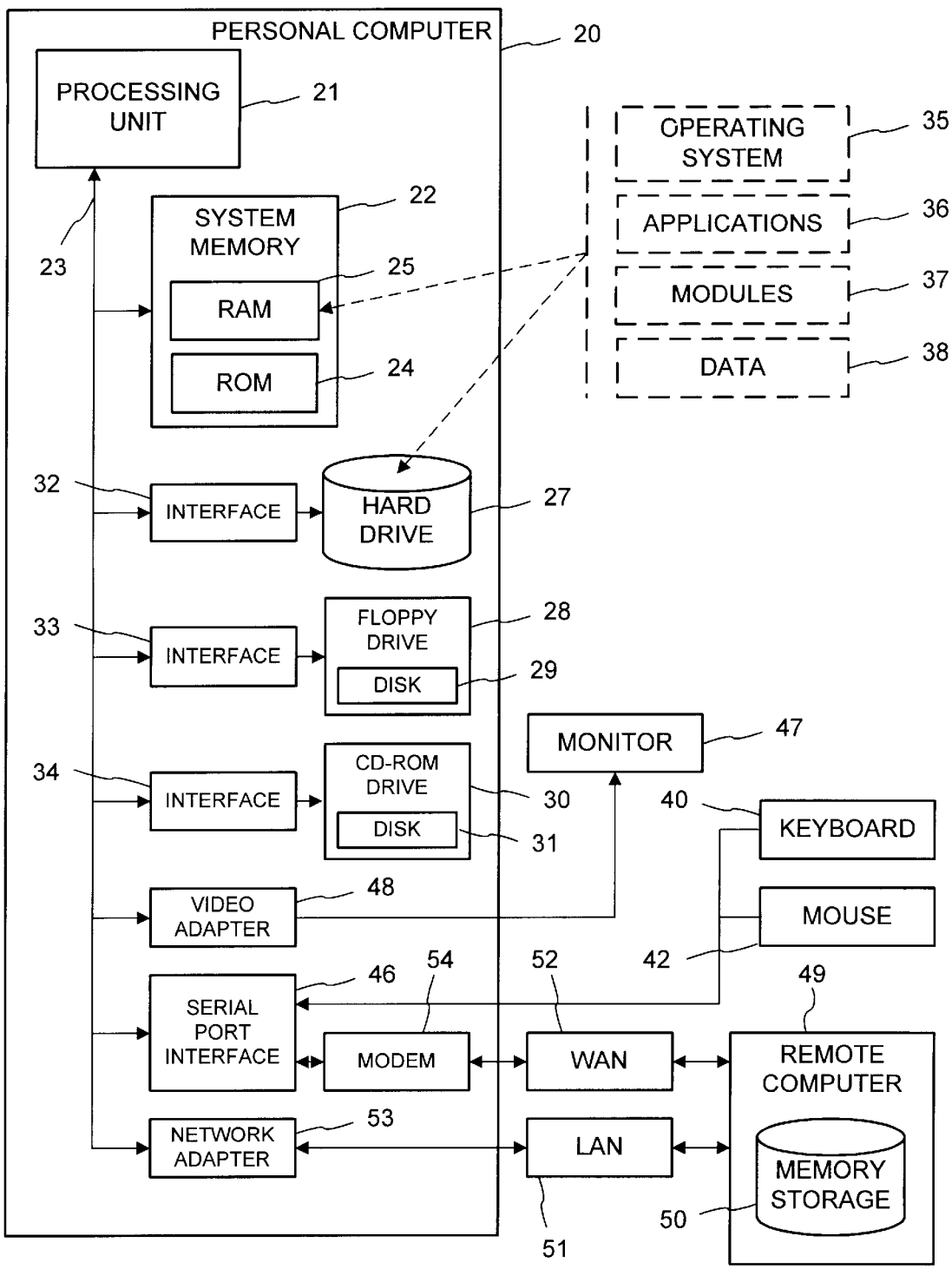
FIG. 1 is a block diagram of a computer system that may be used to implement a method and apparatus for embodying the invention.

FIG. 1 and the following discussion are intended to provide a brief, general description of a suitable computing environment in which the invention may be implemented. While the invention will be described in the general context of computer-executable instructions of a computer program that runs on a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples various system components including the system memory to the processing unit 21. The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the personal computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

HTML Overview

Figure 2:
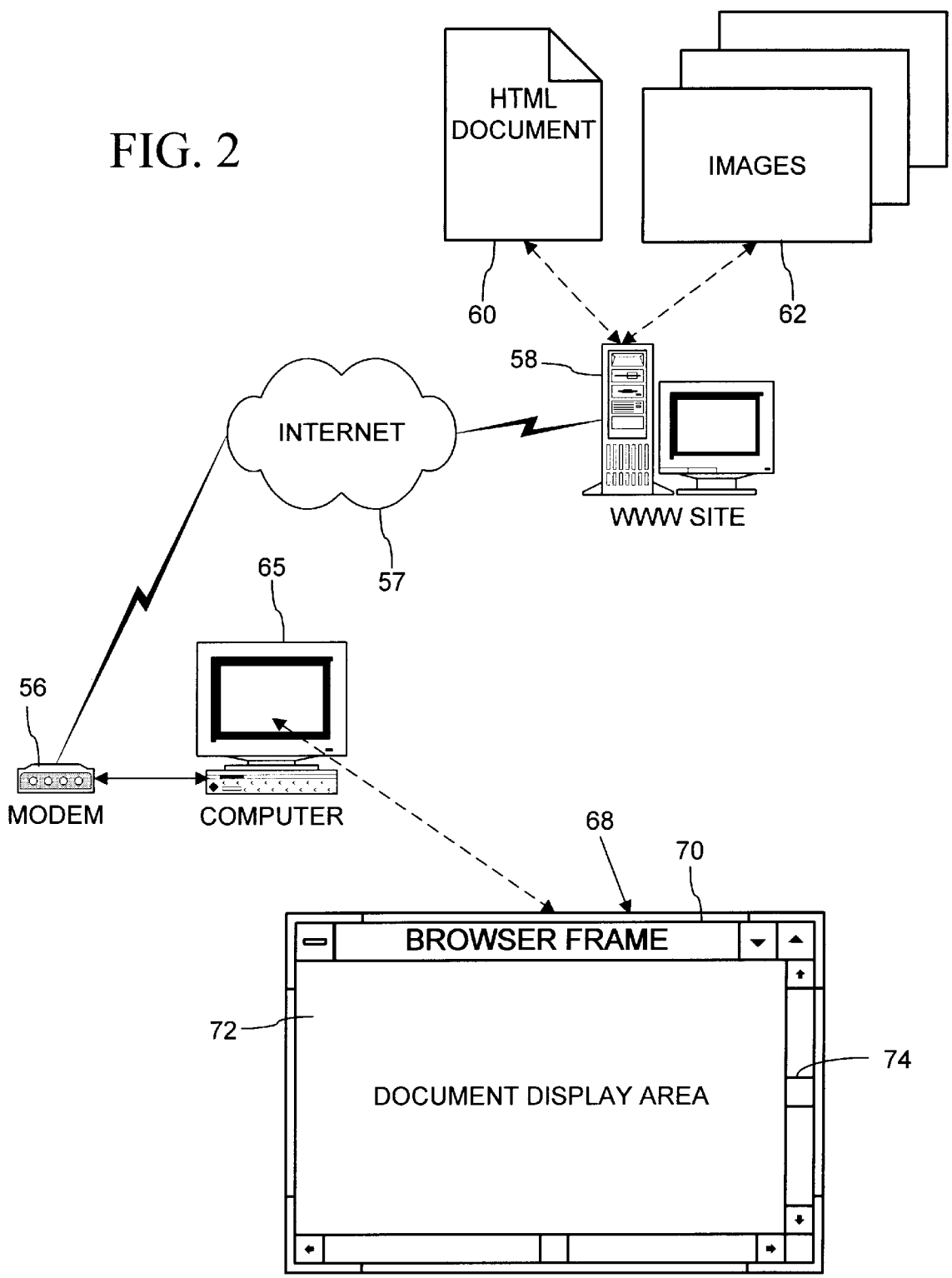
FIG. 2 is a block diagram of a typical arrangement for using a web browser on a computer system, such as that of FIG. 1, to view an HTML document.

HTML is a prevalent language of a portion of the Internet known as the World Wide Web. HTML documents are text documents that are used to produce a rendered version of the document in a display area. The unrendered HTML document is sometimes called HTML "source." A typical HTML viewer (also known as a "web browser") arrangement is illustrated at FIG. 2. An HTML document 60 is rendered in a document display area 72 for viewing by a user.

HTML documents can reside as files of a file system stored in a hard drive 27 (FIG. 1) or other secondary storage of a personal computer 20 (FIG. 1), or reside as resources at a remote computer 58 (FIG. 2) connected to the computer network 57, such as a world-wide web site on the Internet or an intranet. The illustrated document 60 residing at the site 58 conforms with HTML standards, and may include extensions and enhancements of HTML standards. For a detailed discussion of HTML, see *HTML 3: Electronic Publishing on the World Wide Web* by Dave Raggett et al., Addison-Wesley Longman Ltd., Essex, England, 1996.

In conformance with HTML, the illustrated document 60 can incorporate other additional information content 62, such as images, audio, video, executable programs, etc. (hereafter simply "images" 62), which also reside at the remote computer 58. The document 60 and images 62 preferably are stored as files in a file system of the remote computer 58. The document 60 incorporates the images 62 using HTML tags that specify the location of files or other Internet resources containing the images on the Internet 57.

When used for browsing documents, the illustrated browser displays the document in a window 68 or rectangular area of the computer's display 65 allocated to the browser by the operating system. The illustrated window 68 comprises a frame 70, a document display area 72, and user interface controls 74. The browser provides the document display area 72 for displaying the document.

An example of the correspondence between an HTML source document and a resulting rendered display is illustrated at FIGS. 3A and 3B. FIG. 3A illustrates an example of an HTML document 130 in source (unrendered) form. When the HTML document 130 at FIG. 3A is rendered it appears as shown in the window 131 at FIG. 3B. It will be appreciated that web browsers may display rendered versions differing slightly from that shown in FIG. 3B. For example, graphical boxes may have rounded edges or appear as three dimensional objects. Also, the typeface used to display text may differ.

Figure 4:
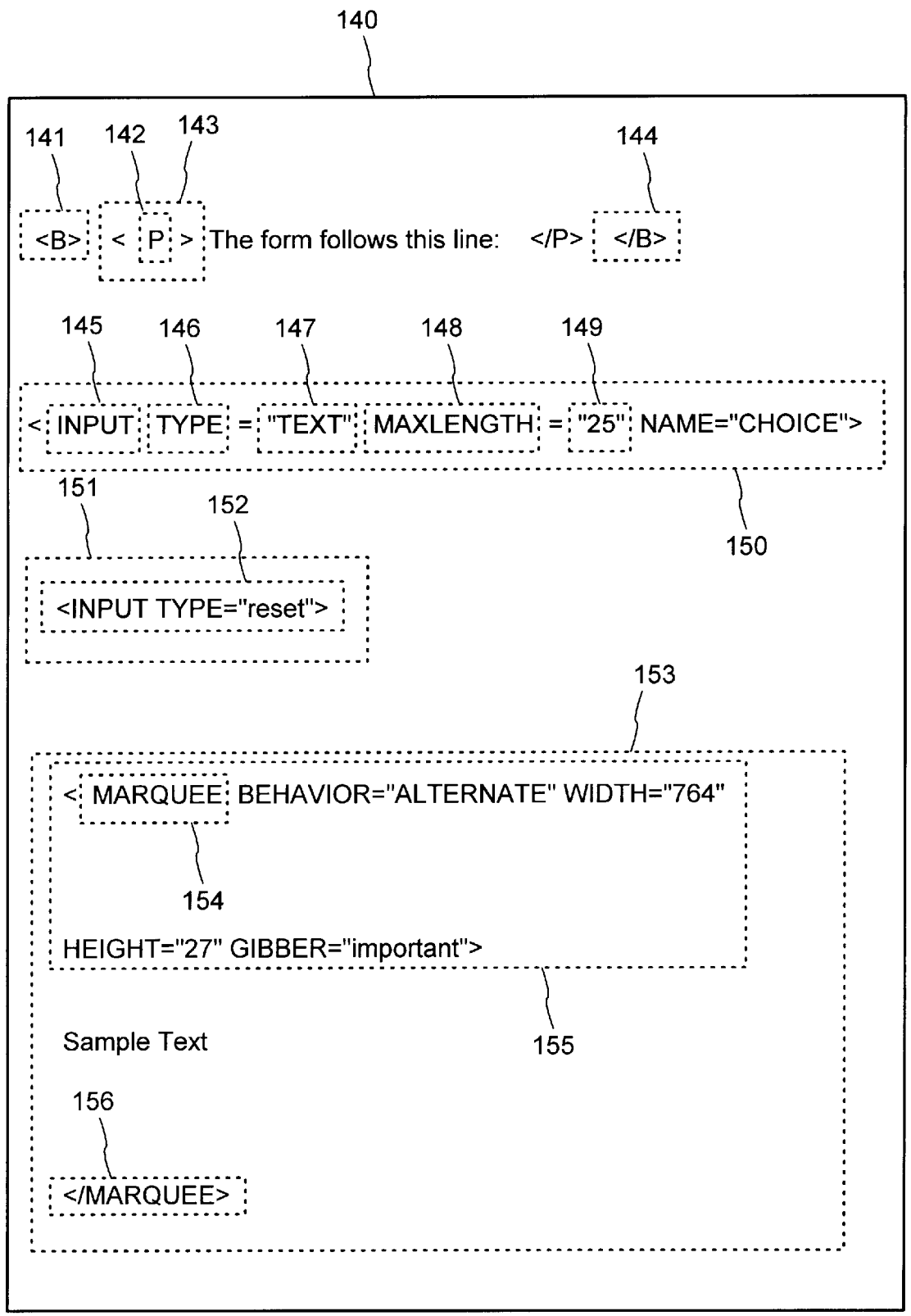
FIG. 4 is a diagram illustrating the terminology used to describe various portions of HTML text in the HTML document of FIG. 3A.
Figure 5:
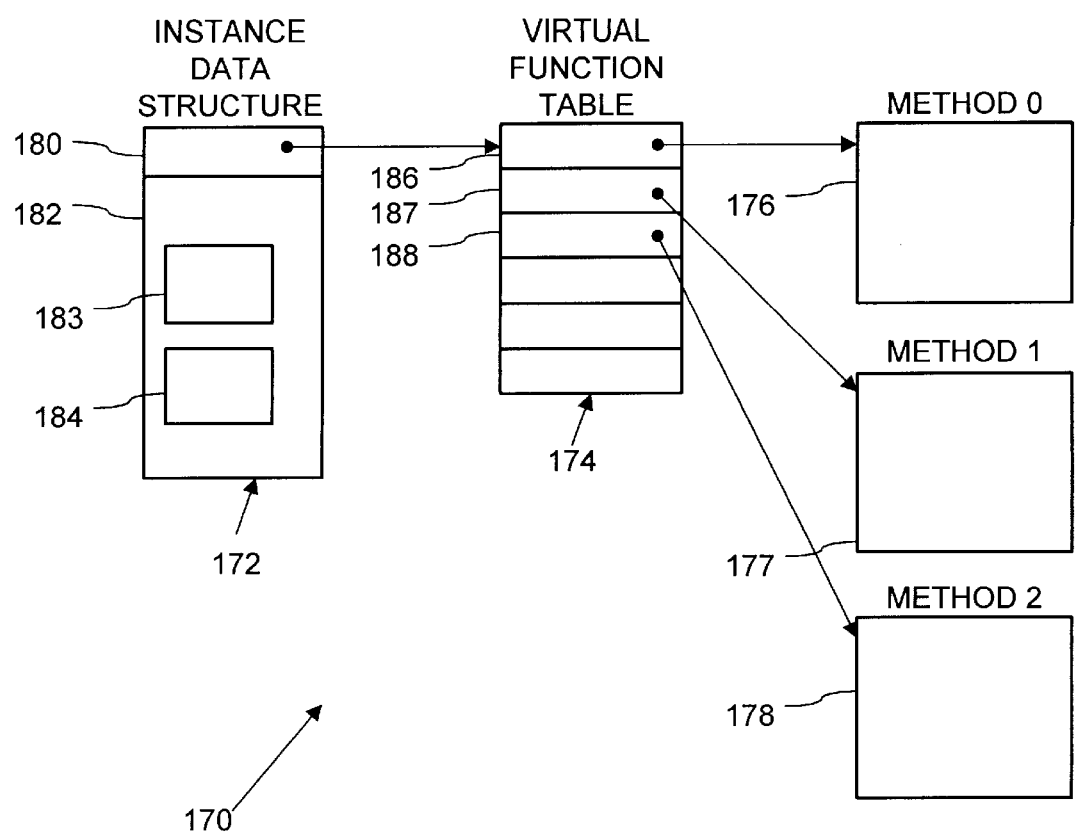
FIG. 5 is a block diagram of an object conforming to the Common Object Model (COM) specification.

An exemplary portion 140 of the HTML source document 130 is illustrated at FIG. 4. The portion 140 comprises HTML tags 141, 143, 144, 150, 152, 155, and 156. An HTML tag is denoted by the presence of HTML tag delimiters (The characters "<" and ">"). The first word of an HTML tag 143 is its HTML tag name 142. Some HTML tags, such as the HTML tag 144, start with the character "/" and are also known as HTML end tags. The HTML tag 150 comprises HTML tag components 145, 146, 147, 148, and 149. Certain HTML tag components such as the HTML tag component 148 serve to denote an HTML attribute keyword and others, such as the HTML tag component 149 serve as an optionally related HTML attribute value. Each HTML tag may have zero, one, or more attributes. Some HTML attribute keywords (e.g., "CHECKED") may have no related HTML attribute value.

The HTML element 151 comprises an HTML tag 152, and the HTML element 153 comprises an HTML start tag 155 and an HTML end tag 156. The first word of the HTML element 153 is its HTML element name 154.

A web browser renders the HTML document according to a well-known process, and ordinarily does not display the HTML tags. For example, the HTML tag "<B>" denotes the beginning of boldface text. When a web browser encounters the "<B>" tag, it does not display it, but rather displays any text following it in boldface type until it encounters the "</B>" end tag.

One particular HTML element has the HTML element name "FORM". An HTML document may have zero, one, or more such HTML elements. Inside the HTML element with the name "FORM" are additional HTML elements, known as HTML form elements. An exemplary HTML form element with form elements inside it follows:

<FORM ACTION="http://a.b.c/xyz.cgi" METHOD="post">
<P>
Please enter a choice:
<INPUT TYPE="TEXT" MAXLENGTH="25" NAME="CHOICE">
</P>
<P>
<INPUT TYPE="submit" NAME="OK">
<INPUT TYPE="reset">
</P>
</FORM>

Some of the form elements have an HTML element name of "INPUT" and an optional "TYPE" attribute keyword. If the "TYPE" attribute keyword is omitted, the form element defaults to a text box. If the "TYPE" attribute keyword specifies an attribute value of "radio," "checkbox," "submit," or "reset," the form element will appear as a graphical radio button, a check box, a submit push button, or a reset push button, respectively, when rendered. Some form elements, such as the "TEXTAREA" form element do not use the "TYPE" attribute keyword. The HTML language specification includes other form elements, and new ones may be added as HTML is extended or enhanced.

Each of the form elements may have additional attributes which are indicated by an HTML attribute keyword and an HTML attribute value. For example, a text box may have the attribute of MAXLENGTH with an attribute value of "25". HTML elements with the name "FORM" ordinarily contain the HTML form elements known as the "reset" and "submit" elements which are HTML elements with the element name of "INPUT" and a TYPE of either "reset" or "submit." When rendered, these elements typically appear as graphical push buttons and may be used to clear the form or send its contents according to a predetermined protocol (e.g. "submit" or "post"), which is indicated in the "FORM" element with the keyword "METHOD." These elements need not be rendered as push buttons, and can be, for example, an image or some other item.

When the HTML document is rendered for presentation to the user, the user can place information in the text boxes, select a radio button, or click on the "submit" graphical push button to submit the information placed the form. The "submit" button can also be an image map. An image map is essentially a "submit" button in the form of an image. When the image map is clicked (i.e., the user clicks a mouse button or some other device while a pointer is positioned over the image map), the associated form is submitted along with additional information concerning where (i.e., the x-y coordinates) within the image map the click occurred.

Numerous other HTML elements exist, such as the "MARQUEE" HTML element, which provides scrolling text, and the "VIDEO" HTML element which provides video. Some HTML elements may not require presentation in the document display area. For example, the "BGSOUND" HTML element provides a background sound (e.g., music that plays while the document is viewed) but need not be shown in the document display area. As discussed above, the number of HTML elements and their features continually grow as HTML is extended and enhanced.

Storage and Stream Overview

Data on a personal computer 20 may be arranged in many ways. One way of arranging data is by using a storage or stream. A storage is a data location that may itself contain data or refer to streams and/or other storages. Streams comprise data of any type and are not required to have a particular internal structure. Storages and streams are well known and may be arranged according to the OLE structured storage model. For a detailed description of storages and streams, see *Inside OLE* 2 by Kraig Brockschmidt, Microsoft Press, Redmond, Wash. 1994.

ActiveX Controls Overview

With reference to FIGS. 5, 11, 13, 15, and 18, the illustrated embodiment of the invention utilizes embeddable objects conforming to the ActiveX Controls specification of Microsoft Corporation. ActiveX controls conform with the component object model (COM) of Microsoft Corporation and are related to Microsoft's OLE standards. For a detailed discussion of COM, ActiveX and OLE, see *Understanding ActiveX and OLE* by David Chappell, Microsoft Press, Redmond, Wash. 1996. A brief overview of ActiveX controls and associated terminology is provided below before discussing the details of the illustrated embodiment. It will be appreciated that embeddable objects may follow other specifications such as the CORBA (Common Object Request Broker Architecture) specification of Object Management Group or be of other formats embeddable in a document editor's native document format.

ActiveX controls are programming objects conforming to Microsoft's COM specification. An object is an instance of a programmer-defined type referred to as a class, which exhibits the characteristics of data encapsulation, polymorphism and inheritance. Data encapsulation refers to the combining of data (also referred to as properties of an object) with methods that operate on the data (also referred to as member functions of an object) into a unitary software component (i.e., the object), such that the object hides its internal composition, structure and operation and exposes its functionality to client programs that utilize the object only through one or more interfaces. An interface of the object is a group of semantically related member functions of the object. In other words, the client programs do not access the object's data directly, but must instead call functions on the object's interfaces to operate on the data.

Polymorphism refers to the ability to view (i.e., interact with) two similar objects through a common interface, thereby eliminating the need to differentiate between two objects. Inheritance refers to the derivation of different classes of objects from a base class, where the derived classes inherit the properties and characteristics of the base class (such as the interfaces of the base class).

The COM specification defines binary standards for objects and their interfaces which facilitate the integration of software components. At FIG. 5, a typical object 170 is represented in the computer system 20 (FIG. 1) by an instance data structure 172, a virtual function table 174, and member functions 176–78. The instance data structure 172 contains a pointer 180 to the virtual function table 174 and the data 182. A pointer is a data value that holds the address of an item in memory. The data 182 can include the properties (or data members) 183 and 184. The virtual function table 174 contains the entries 186–88 for the member functions 176–78. Each of the entries 186–88 contains a reference to the code 176–78 that implements the corresponding member function.

The pointer 180, the virtual function table 174, and the member functions 176–78 implement an interface of the object 170. Client programs interact with the object 170 by obtaining a pointer (referred to as an interface pointer) to the pointer 180 of the virtual function table 174. The following code (in the C++ programming language) implements a call to member functions of an interface pointed to by pointer pInterface:

pInterface->MemberFunction( . . . )

Figure 11:
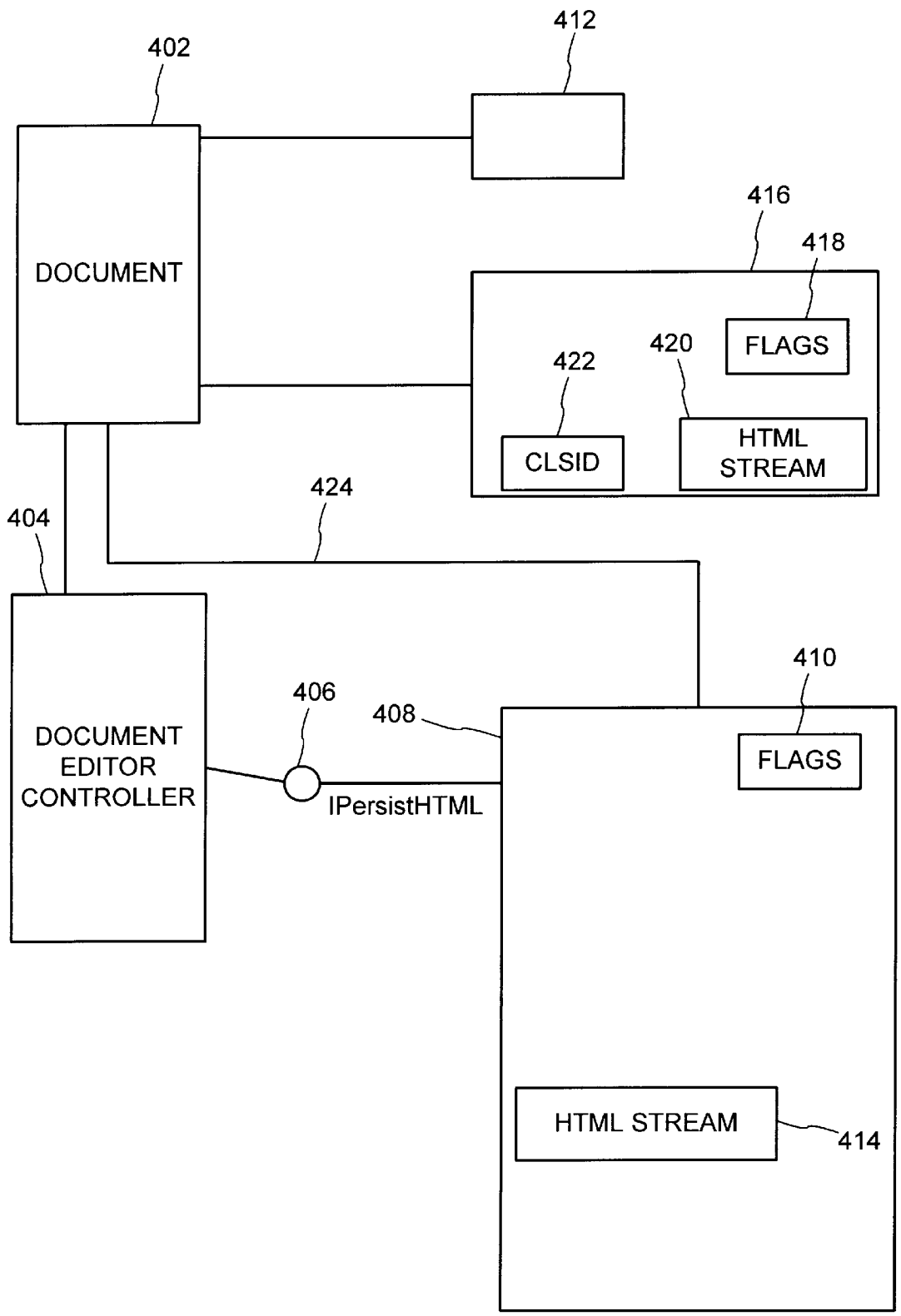
FIG. 11 is a block diagram of a document editor for providing an embeddable object relating to a storage, such as the storages shown in FIG. 9.

By convention, the interfaces of an object are illustrated graphically as a plug-in jack as shown for the IPersistHTML interface 406 at FIG. 11. Also, interfaces conventionally are given names beginning with a capital "I." Objects can include multiple interfaces which are implemented with one or more virtual function tables. The member function of an interface is denoted as "IInterfaceName::FunctionName."

The object 170 conforming to the COM specification exhibits data encapsulation by exposing its interfaces (semantic groupings of its member functions) to client programs. The client programs interact with the object 170 by calling the member functions 176–78 on a particular interface of the object, but do not directly manipulate the object's data. The object 170 also exhibits polymorphism and inheritance in that the object 170 can provide interfaces in common with a base class and other similar objects, so that client programs can interact with each of the objects in the same manner by calling member functions of the interface that the objects have in common.

ActiveX controls conform to the COM standard described above. The class of an ActiveX control is uniquely identified by a class identifier (CLSID). Certain interfaces to an ActiveX control, such as IPersistStreamInit are well known in the art and are described in more detail below. For a detailed discussion of various interfaces provided by various ActiveX controls, see *Understanding ActiveX and OLE* by David Chappell, Microsoft Press, Redmond, Wash. 1996.

Part of the ActiveX Controls specification requires that the ActiveX control be able to associate a particular one of its properties with a dispatch identifier (DISPID). Thus, the DISPID can serve as a property identifier. The dispatch identifier is an integer value and can be used in conjunction with a particular interface called IDispatch to set or read the properties of an ActiveX control. One of the methods (or member functions) provided by IDispatch is called Invoke. The IDispatch::Invoke method itself includes methods arranged in a dispinterface. Given an integer value, the dispinterface invokes one of the methods of the dispinterface, and passes any provided parameters to the method. Commonly, these methods of the dispinterface are operable to set or read the properties of ActiveX control. Thus, the Invoke method can be used to set or read a property of an ActiveX control if provided with the following: the DISPID that identifies the particular property to be set or read (which is used to determine the associated property-setting or property-reading method), whether the property is to be set or read, and a value for setting or a location for reading the property. In this way, properties of an ActiveX control can be set or read with reference to the DISPID associated with a particular property.

The IPersistStreamInit interface provides a means for an object to persist itself. An object may be in any number of possible states at a given time. For instance, the properties may be set to particular values (e.g., a graphical push button may have its "name" property set to "OK"). Persisting an object means producing and storing whatever state data is required for the object to restore its present state at some subsequent time. Later, the object "depersists" (e.g. acquires its state data) by accessing the state data to restore the previous state. The state data is typically of some format not compatible with HTML.

Accordingly, the IPersistStreamInit interface provides two methods, IPersistStreamInit::Save and IPersistStreamInit::Load. IPersistStreamInit::Save generates a stream (the persisted state of the object). If this stream is provided to IPersistStreamInit::Load, the object is restored to its present state. Another interface, IPersistStorage, operates in a similar manner but uses a storage instead of a stream.

Part of the ActiveX specification provides for embedding an ActiveX control within another object. The object in which the ActiveX control is embedded is called a control container. The application that can manipulate the ActiveX control embedded in a control container is sometimes called an ActiveX control host. Example ActiveX control hosts are Microsoft Visual Basic, the Internet Explorer, and Microsoft Word 97 of Microsoft Corporation. Applications typically implement their documents as objects, so in an arrangement in which an ActiveX control is embedded in a document editor's document involves an object (the ActiveX control) contained by another object (the control container or document), both of which can be manipulated by the host (the document editor).

Embedding is achieved through a particular set of interfaces of the control container and the embedded object. These interfaces provide a way for the control container and the embedded object to communicate about such details as when the embedded object should display itself or be redrawn. For further details concerning embedding, see *Understanding ActiveX and OLE* by David Chappell, Microsoft Press, Redmond, Wash. 1996.

It will be appreciated that a wide variety of embeddable ActiveX controls such as text boxes, graphical push buttons, background sounds and scrolling texts exist, and additional ones can be created.

Microsoft Word 97 Overview

Microsoft Word 97 is a document editor offering a word processing environment with a rich set of features including WYSIWYG editing, spell checking, and an extensive on-line help facility. Microsoft Word 97 can create, edit, and save documents as well as copy, cut, and paste items into and out of Microsoft Word 97. Microsoft Word 97 can host an ActiveX control and its native documents can serve as ActiveX control containers that support embedding of ActiveX controls. Further, an embedded ActiveX control and its properties can be manipulated within Microsoft Word 97.

RTF Overview

Rich Text Format (RTF) is one of the document formats Microsoft Word 97 can convert into its native format. RTF is a well-known format used to represent formatted text and includes mechanisms for marking text as bold and italic. RTF supports many features such as color tables, style sheets, hidden text, storage of document statistics, and others. RTF also has provisions for placing objects such as ActiveX controls into an RTF stream. RTF is a plain text format that is ordinarily presented to a user in rendered form.

Certain HTML tags are readily translated into RTF. For example, the HTML tag "<B>" is associated with bold text, and the HTML tag "<BR>" indicates a line break. Each of these have a corresponding RTF translation.

Since Word can convert RTF into its own internal format, Microsoft Word 97 can be used to convert an RTF document, view the document, and edit it in Microsoft Word 97's feature-rich environment, including WYSIWYG editing, spell checking, and an extensive on-line help facility.

Figure 6:
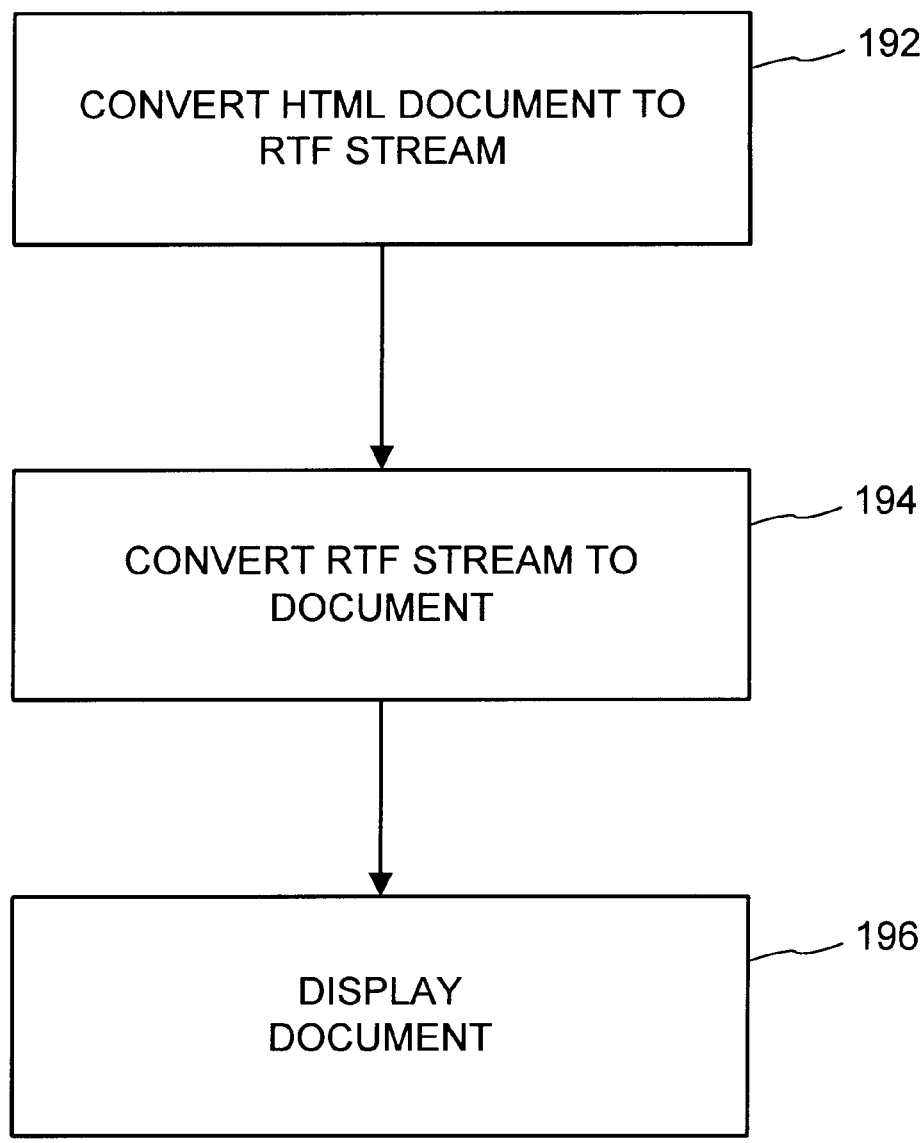
FIG. 6 is a flowchart showing an overview of the HTML to Microsoft Word 97 native format conversion process shown in FIGS. 7–14.

Overview of HTML Document to Microsoft Word 97 Native Format Document Conversion Process A flowchart illustrating an overview of the HTML document to Microsoft Word 97 native format conversion process is shown at FIG. 6. At step 192, the HTML document is converted to an RTF stream. Then, at step 194, the RTF stream is converted to a document (e.g., a document in Microsoft Word 97 native format). Finally, at step 196, the document is displayed. One of the features of the invention is that the logic pertaining to step 192 does not have to include logic to instantiate and set the properties of objects. In this way, the HTML to RTF converter logic can be smaller, and the same converter logic can be used to process HTML documents containing new extensions or enhancements. Although the illustrated embodiment first converts the document to RTF, conversion to some other intermediate format, directly to Microsoft Word 97's native format, or directly to any number of other formats could be achieved.

Figure 7:
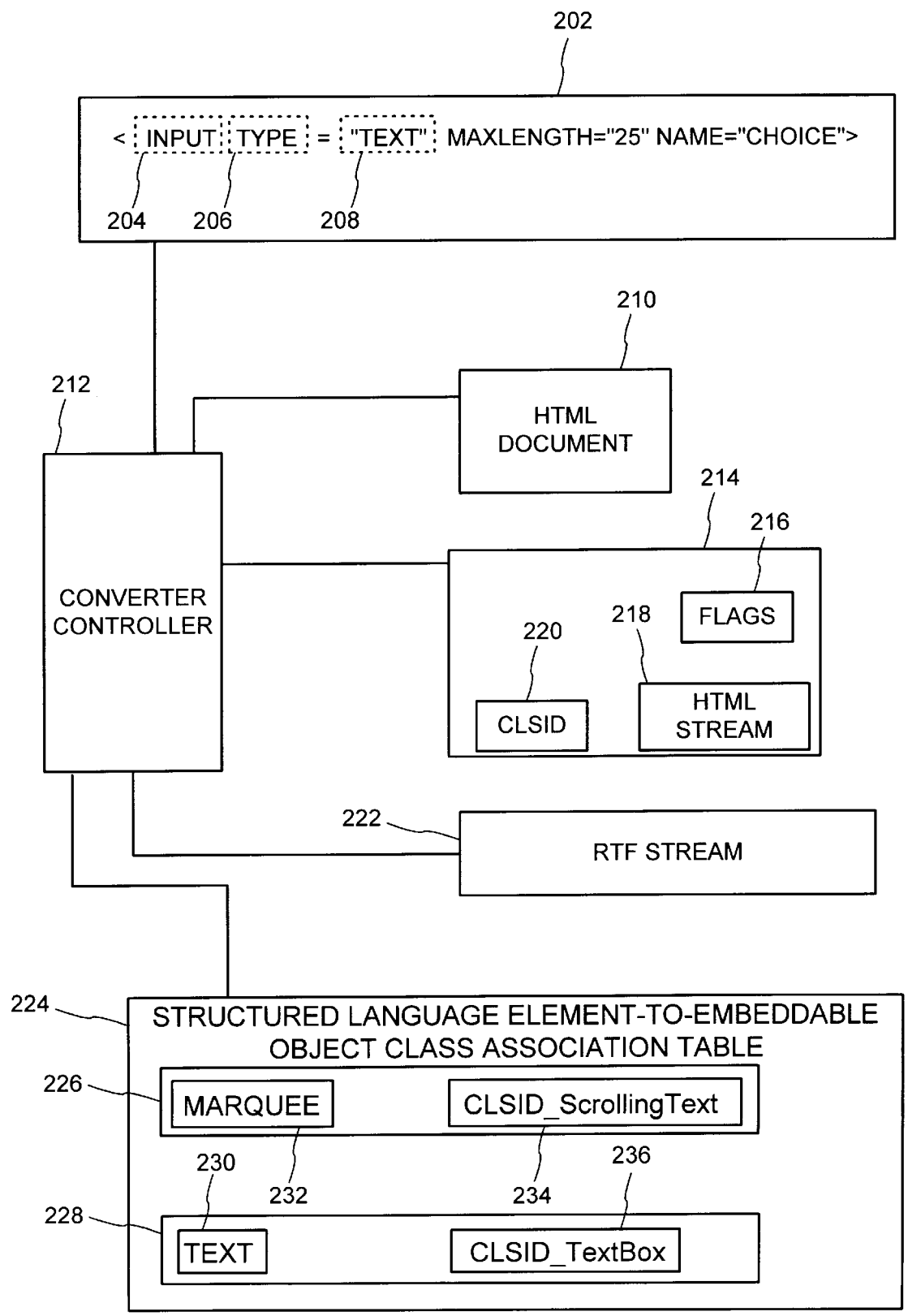
FIG. 7 is a block diagram of an HTML to RTF converter used to convert an HTML document such as that shown in FIG. 3A.

An HTML to RTF converter is illustrated at FIG. 7. Converter controller 212 controls the conversion process. The HTML document 210 is a file comprising HTML tags. The HTML document 210 may reside as a file of a file system stored in the hard drive 27 (FIG. 1) or other secondary storage of a personal computer 20, or reside as resources at a remote computer 58 (FIG. 2) connected to the computer network 57, such as a world-wide web site on the Internet or an intranet. The flags 216, a CLSID 220, and an HTML stream 218 are shown as inside a storage 214; however, it will be appreciated that in FIG. 7 and the other figures, a storage may be internally represented as pointers to the items. The RTF stream 222 is a location into which text in Rich Text Format corresponding to the HTML document 210 is written.

The Structured Language Element-to-Embeddable Object Class Association Table 224 associates an HTML tag component 226 with a particular class identifier 234. The Table 224 is described in more detail below. A temporary location 202 is used to temporarily store portions of the HTML document 210.

Figure 8:
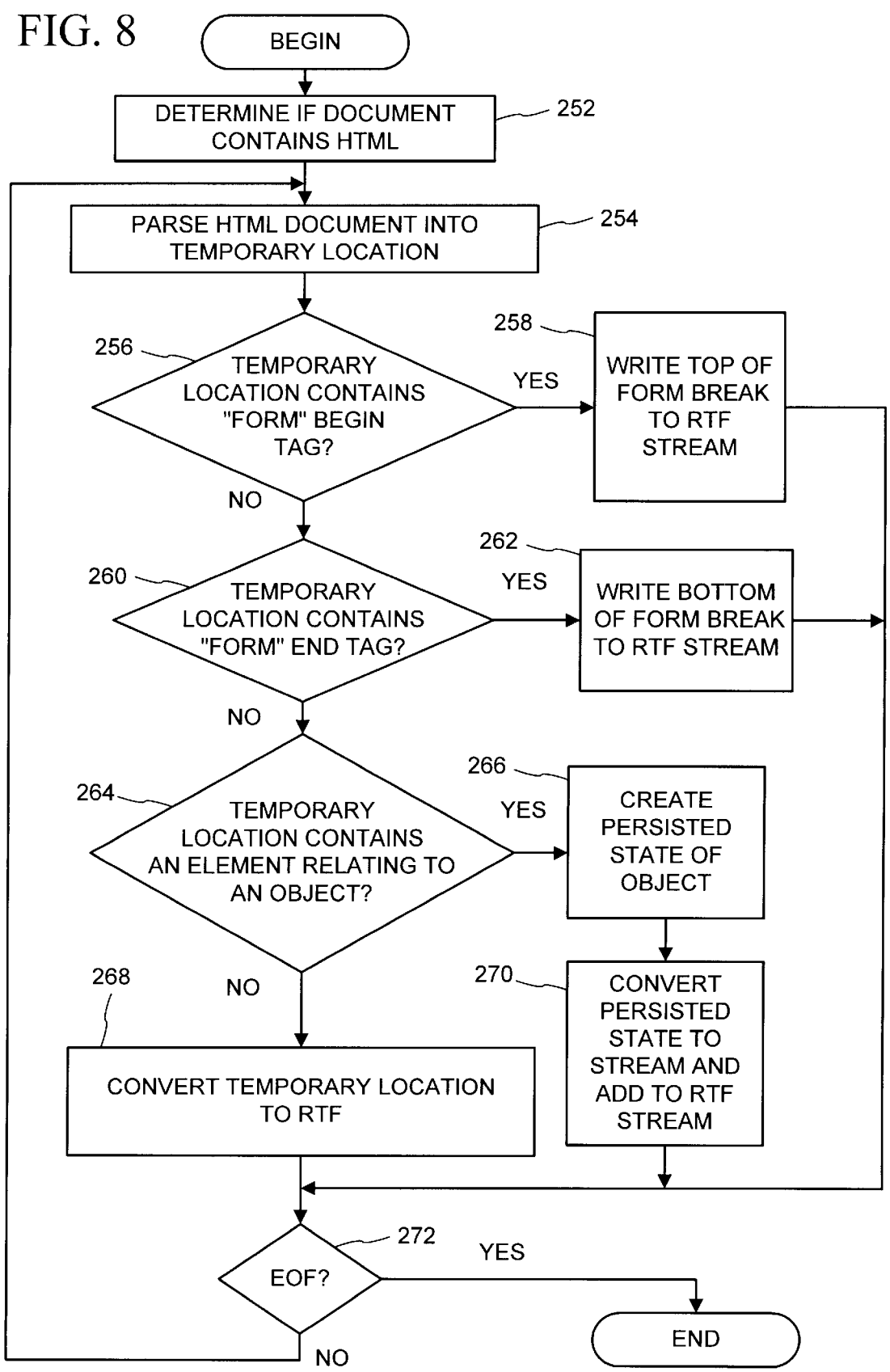
FIG. 8 is a flowchart of a method for converting an HTML document, such as that shown in FIG. 3A, to an RTF stream.

One way to start the conversion process is to open the HTML Document 210 with the Microsoft Word 97 application. Microsoft Word 97 provides a familiar means of opening a document with the "File, Open . . . " command available from the Microsoft Word 97 menu bar. The user selects the HTML document 210, and Microsoft Word 97 proceeds according to the HTML to RTF conversion method illustrated at FIG. 8.

At step 252, the HTML document 210 is examined to determine if it contains HTML. A common method for making such a determination is examining the HTML document 210 for the HTML indicator "<HTML>". If "<HTML>" is present, the conversion process continues by opening the Rich Text Format (RTF) stream 222. If there is no "<HTML>", the HTML document 210 is opened according to some non-HTML procedure. It will be recognized that other methods for determining if the HTML document 210 contains HTML may be used, such as detecting any HTML tag within the document or detecting a particular filename extension (e.g., ".html" or ".htm").

At step 254, the HTML document 210 is parsed according to familiar parsing procedures so that a next portion of the document is contained in the temporary location 202. For instance, if the next portion of the HTML document 210 contains an HTML tag, the tag is placed in the temporary location 202. If, instead, the next portion of the HTML document 210 contains plain text that is not an HTML tag, the plain text is placed into the temporary location 202. In special cases an entire HTML element is required for conversion. In such a case, if a particular HTML begin tag is detected, the HTML begin tag, the text following the tag (if any), and the HTML end tag are placed into the temporary location 202. For example, the HTML tag name "TEXTAREA" indicates the begin tag of an HTML "TEXTAREA" form element. If such an HTML tag is encountered, additional information is read from the HTML document 210 into the temporary location 202 until an HTML "</TEXTAREA>" end tag is encountered. The special cases are indicated within the parsing logic. It will be appreciated that the parsing process may take many forms, such as using index pointers to the document denoting the begin and end locations of the respective portion of the document instead of copying the next portion to a separate location.

Next, the contents of the temporary location 202 are examined. First, at step 256, the temporary location 202 is examined to determine if it contains an HTML "FORM" tag (i.e., an HTML tag with a tag name of "FORM"). If so, the beginning of a form is indicated. At step 258, a top of form break is inserted into the RTF stream 222 as the text phrase "Top of FormF" (where F is the number of the current form in the document, starting with 1) formatted with a special paragraph style "z-Top of Form". Special allowance is made for storing information contained in the "FORM" tag relating to the submission of the form so that it can be retrieved later when creating an associated "INPUT" HTML element for submitting the form, as described below. Certain error checking is included at this point to detect if a Microsoft Word 97 form is begun while another Microsoft Word 97 form has already begun and not ended.

Second, at step 260, the temporary location 202 is examined to determine if it contains an HTML "</FORM>" tag, which denotes the end of an HTML form. If the "</FORM>" tag is present, a bottom of form break is written into the RTF stream 222 at step 262. The bottom of form break is inserted into the RTF stream 222 as the text phrase "Bottom of FormF" (where F is the number of the current form in the document) formatted with a special paragraph style "z-Bottom of Form". Certain error checking is included at this point to detect if there is no Microsoft Word 97 form that has been begun and not ended. It will be appreciated that the top and bottom of form breaks could be denoted in any number of ways, such as by placing a set of special characters into the RTF stream 222.

Third, at step 264, the method uses the Structured Language Element-Embeddable Object Class Association Table 224, described below, to determine an appropriate CLSID 220. If Table 224 indicates an appropriate class identifier 234 or 236, the temporary location 202 relates to an object (e.g., an ActiveX control for representing a text box, a graphical push button, or scrolling text). Then, a persisted state of an object is created in the storage 214 at step 266. The persisted state is created by creating a storage 214, placing the class identifier 234 or 236 indicated by the Table 224 into the CLSID 220, placing the text contained in the temporary location 202 in the HTML stream 218, and marking the storage as HTML by setting the flags 216. It will be appreciated that the determination of whether to convert the temporary location 202 to an object could alternatively be made by examining some other data structure such as a list of structured language tag components. Then, at step 270, the storage 214 is converted to a stream using the well known OleConvertIStorageToOLESTREAM function and passed to the RTF stream 222. Preferably, a special RTF tag is used to denote that the stream relates to HTML when it is passed to the RTF stream 222.

If no class identifier 234 or 236 is determined at step 264, the temporary location 202 is converted to Rich Text Format (RTF) at step 268 according to familiar methods and placed into the RTF stream 222. If any additional information from the HTML document 210 is required to complete the conversion to RTF, it is read from the HTML document 210. If the conversion to RTF cannot be made, the HTML is ignored.

At step 272, the method checks for an EOF condition to determine if the end of the HTML document 210 has been reached. If so, the HTML document 210 is closed, the RTF stream 222 is ended, and the method ends. Otherwise, the next portion of the HTML document 210 is parsed in a further iteration of steps 252–270. The conversion process also handles certain additional details of parsing HTML, such as the well known specialized "<HEAD>" and "<BODY>" tags. Additional details of the conversion process are described below.

Structured Language Element-to-Embeddable Object Class Association Table

In order to facilitate the HTML element to embeddable object conversion process, the converter uses a Structured Language Element-to-Embeddable Object Class Association Table 224 illustrated at FIG. 7. An entry 226 in the Table 224 associates an HTML tag component 226 with an object class identifier (CLSID) 234. For example, if the temporary location 202 comprises the tag component "MARQUEE", the Table 224 is consulted for the tag component "MARQUEE" and an entry 226 is found indicating a class identifier 234 of CLSID_ScrollingText. The class identifier 234 of an object providing marquee functionality (an ActiveX control providing scrolling text) is stored in the CLSID 220. The Structured Language Element-to-Embeddable Object Class Association Table 224 is implemented as two parallel arrays, one comprising HTML tag components, the other comprising class identifier information. When an index to the one array indicates a certain tag component, the same index to the other array indicates the associated class identifier.

With respect to step 264, above, one of the HTML tag components 204, 206, or 208 is selected, then the Table 224 is searched for the selected tag component. In some cases, an HTML tag component 204, 206, or 208 may indicate a default value (e.g., the HTML tag component "INPUT" defaults to a TYPE of "TEXT."), in which case the table is searched for the default if no HTML tag component indicates otherwise. The Table 224 is searched by matching the selected tag component 204, 206, or 208 with the HTML tag components 230 or 232. If an entry 228 with a match 230 is found, the associated class identifier 236 indicates the class identifier to be stored in the CLSID 220.

Converting an RTF Stream to a Microsoft Word 97 Document

Figure 9:
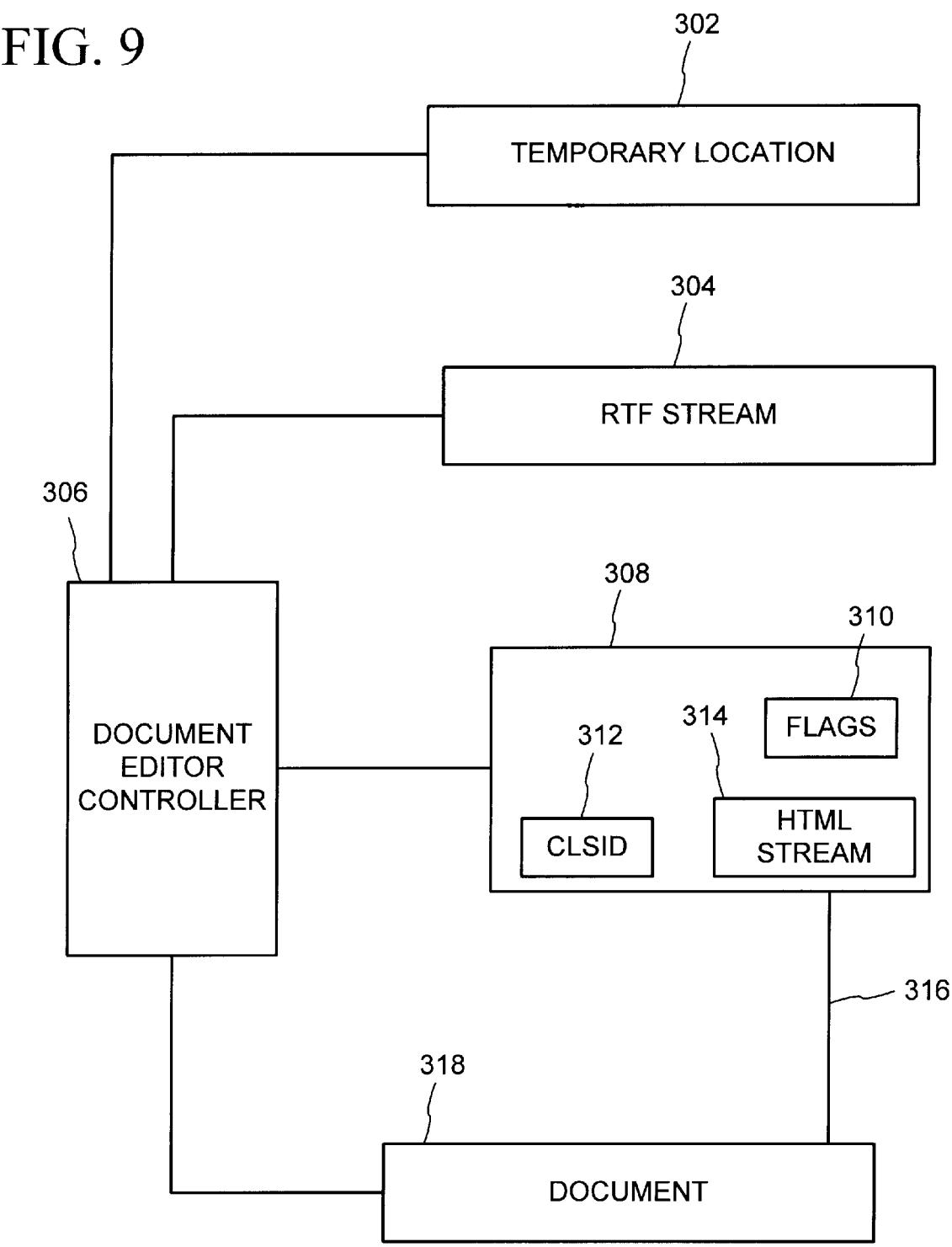
FIG. 9 is a block diagram of a document editor for processing an RTF stream, such as the RTF stream shown in FIG. 8 to produce storages relating to HTML elements.
Figure 10:
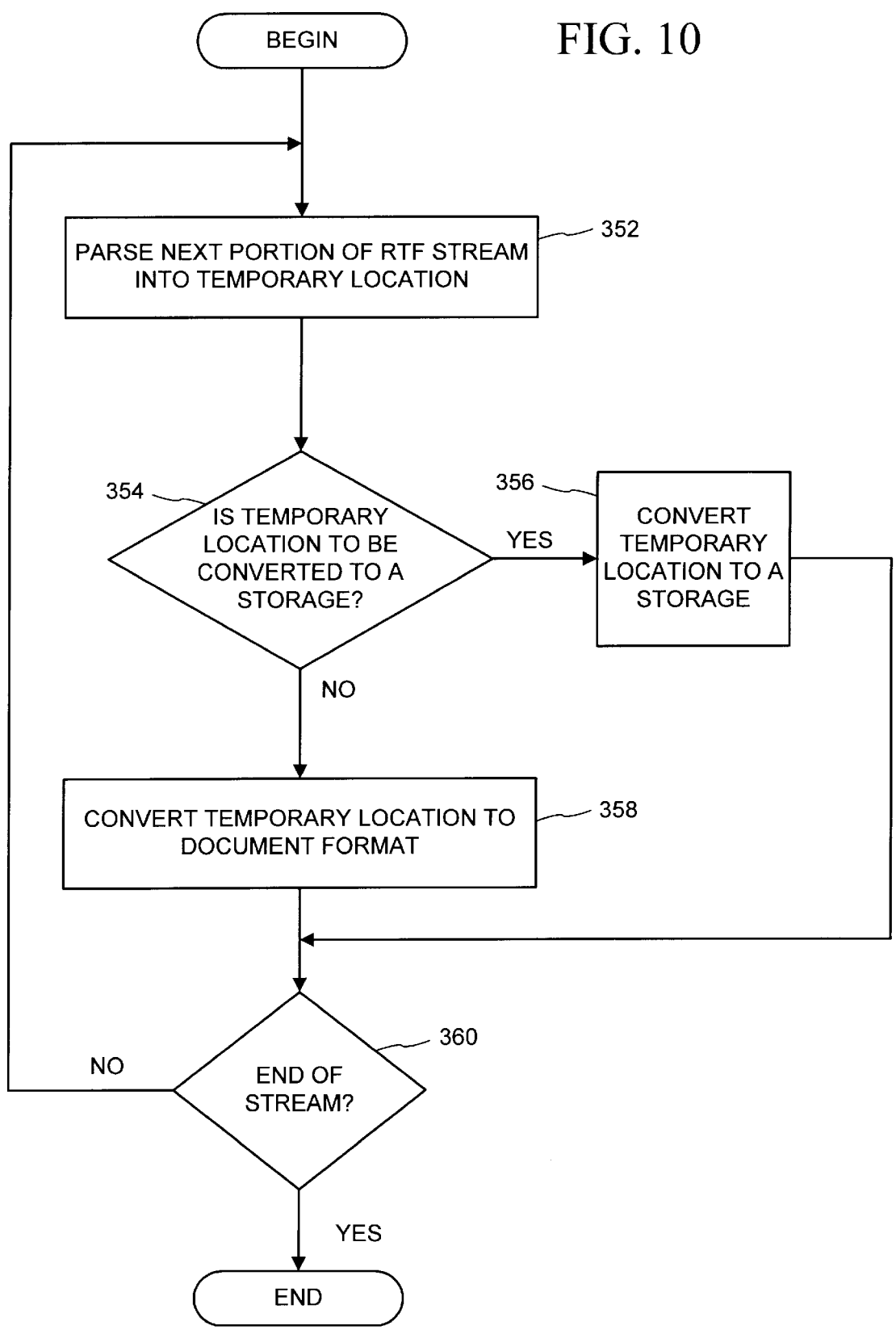
FIG. 10 is a flowchart of a method for processing an RTF stream, such as that shown in FIG. 9, to produce storages relating to HTML elements.

After the HTML document 210 has been converted to the RTF stream 222, the RTF stream 222 is converted to a document (e.g. a Microsoft Word 97 native format document). FIG. 9 is a block diagram showing a document editor controller 306 (e.g. Microsoft Word 97), an RTF stream 304, and a document 318. The document 318 may reside as a file of a file system stored in the hard drive 27 (FIG. 1) or other secondary storage of a personal computer 20, or it may be located in the RAM 25 of the system memory 22. A method for converting the RTF stream 304 to the document 318 is illustrated at FIG. 10.

At step 352, the next portion of the RTF stream 304 is parsed according to familiar methods into the temporary location 302. At step 354, it is determined if the temporary location 302 is to be converted to a storage by detecting a special RTF tag in the temporary location 302. At step 356, a storage 308 is created, and the contents of the temporary location 302 are used to determine the flags 310, the CLSID 312, and the HTML stream 314. The CLSID 312 and the HTML stream 314 are related to the CLSID 220 and the HTML stream 218 of FIG. 7. A link 316 between the document 318 and the storage 308 is kept so that it can be determined where within the document 318 the storage 308 resides.

If at step 354, it is determined that the temporary location 302 is not to be converted to a storage, at step 358, the temporary location 302 is converted to the format of document 318 (e.g. Microsoft Word 97 native format) according to familiar methods and passed to the document 318.

At step 360, it is determined if the end of the RTF stream 304 has been reached. If so, the method ends, otherwise the RTF stream 304 is parsed in a further iteration of steps 352–358. After the RTF stream 304 is converted to the document 318, the document 318 is displayed as described below.

Preparing the Document for Display

Figure 12:
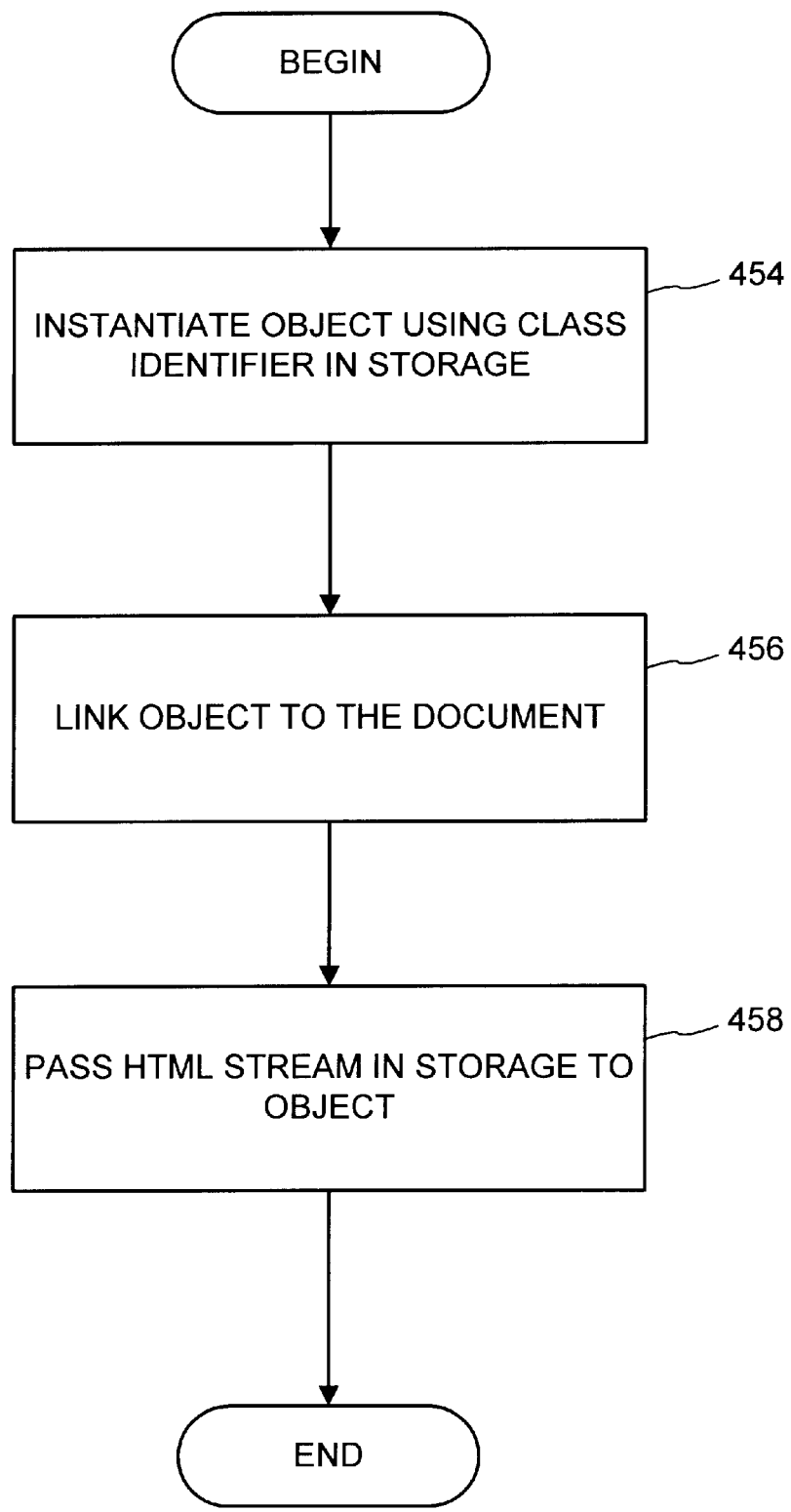
FIG. 12 is a flowchart of a method for providing an embeddable object relating to a storage, such as the storages shown in FIG. 9.

At FIG. 11, a document 402 (e.g. a Microsoft Word 97 document) is displayed by a document editor controller 404 (e.g. Microsoft Word 97). The process for displaying the document 402 is well known. Commonly, the entire document 402 is not displayed at once. Instead, a certain portion of it is rendered for presentation to the user. As part of the display process, a facility is implemented to indicate when a particular item is to be presented to the user. When the facility indicates that an item relating to a storage 412 or 416 has come into view for presentation to the user, the following method for presenting the storage to the user is used if the flags 418 indicate that the storage 416 relates to HTML. The method is shown at FIG. 12.

At step 454, an object 408 is instantiated using the CLSID 422. At step 456, a link 424 to the object 408 is placed in the document 402 to indicate where within the document 402 the object 408 resides. Then, at step 458, the HTML stream 420 is passed to the object 408 using the LoadHTML member function of the IPersistHTML interface 406 (IPersistHTML::LoadHTML) which stores the HTML stream 420 in the HTML stream 414. The details of IPersistHTML::LoadHTML are described below.

Using the HTML Stream with IPersistHTML::LoadHTML

Figure 13:
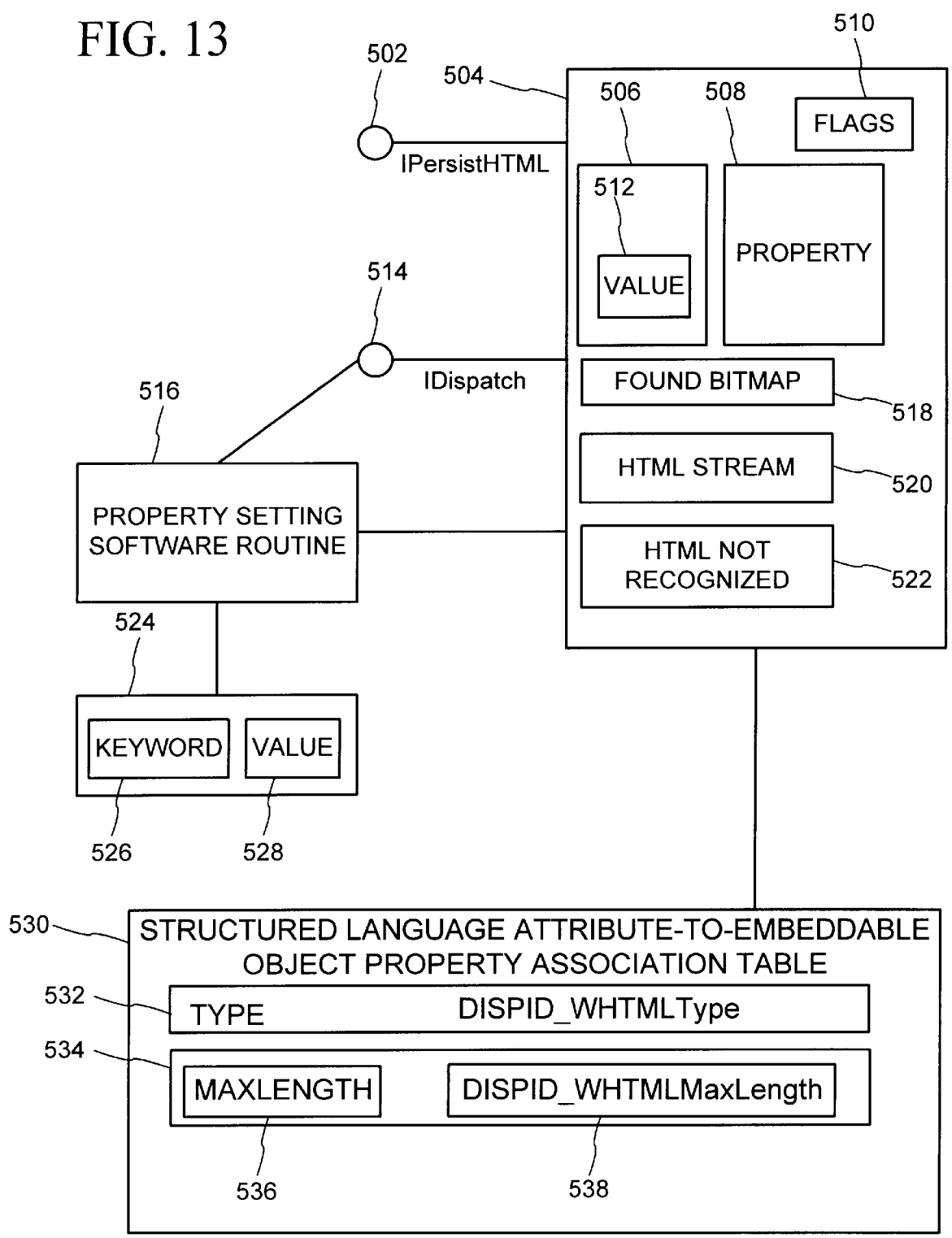
FIG. 13 is a block diagram of an embeddable object such as that shown in FIG. 11, a Structured Language Attribute-to-Embeddable Object Property Association Table and a property setting software routine.

With reference to FIG. 13, after the HTML stream 520 has been passed to the object 504 using the LoadHTML member function of the IPersistHTML interface 502, a property 506 of the object 504 may need to be set to a value such as 512.

Although not required, preferably, the object 504 uses a software routine that can assist during the property setting process. The object 504 passes the HTML stream 520 and a Structured Language Attribute-to-Embeddable Object Association Table 530 to a property setting software routine 516 called LoadPropertiesFromHTMLStream. Preferably, the Structured Language Attribute-to-Embeddable Object Association Table is defined as part of the class of objects identified by the CLSID 422 (FIG. 11) used to instantiate the object 504.

LoadPropertiesFromHTMLStream parses the HTML stream 520 and uses the Structured Language Attribute-to-Embeddable Object Property Association Table 530 to set the properties 508 and 506 of the object 504. The Structured Language Attribute-to-Embeddable Object Property Association Table 530 contains entries for use during the property setting process. Each entry 532 or 534 in Table 530 contains an HTML attribute keyword 536 and a corresponding object property identifier (e.g. an ActiveX control dispatch identifier or DISPID) 538.

The Structured Language Attribute-to-Embeddable Object Property Association Table 530 is implemented as an array of HTML_ATTR_DESC structs. HTML_ATTR_DESC is defined as follows:

```
struct HTML_ATTR_DESC
{
        DISPID    dispid;         // dispid of corresponding property.
        LPTSTR    pszName;        // Name of Attribute.
        VARTYPE   vt;             // variant type of the property.
        long      lValueImplied;
                  // If not null, the implied value if name but no
                  // value. So, if an attribute is present, but does not
                  // contain a declared value, this will be used.
        BOOL      fImpliedBool;
                  // Presence of this attribute implies True
```

```
// but the property does not have a value,
// e.g., the MULTIPLE property of the
// SELECT tag. Absence implies False.
};
```

The members of the struct can be used to track special cases, such as the "CHECKED" attribute which defaults to a value of "TRUE." Arrays and structs are well known data structures available in the C and C++ languages. An example table 530 for a text box (i.e., an HTML "INPUT" element with a type of "TEXT") follows:

```
//    This is an example
//    for a text box. It also works for a "password" HTML element.
HTML_ATTR_DESC s_TextHTMLProps[ ] =
{
    {   DISPID_WHTMLType,         TEXT("TYPE"),        VT_BSTR,  0,  FALSE  },
    {   DISPID_WHTMLMaxLength,    TEXT("MAXLENGTH"),   VT_I4,    0,  FALSE  },
    {   DISPID_WHTMLWidth,        TEXT("WIDTH"),       VT_I4,    0,  FALSE  },
    {   DISPID_GROUPNAME,         TEXT("NAME"),        VT_BSTR,  0,  FALSE  },
    {   DISPID_VALUE,             TEXT("VALUE"),       VT_BSTR,  0,  FALSE  }
};
```

It is contemplated that as new objects are written by software developers, the new objects may use LoadPropertiesFromHTMLStream during the property setting process by providing a Structured Language Attribute-to-Embeddable Object Property Association Table 530 to facilitate conversion between HTML and a new object developed by the developer. In this way, the new object avoids having to duplicate the functionality of LoadPropertiesFromHTMLStream, and the logic in the control can be smaller. The object is not required to use LoadPropertiesFromHTMLStream. Also, it will be appreciated that the properties 506 and 508 of the object 504 may be set in any number of other ways such as by another program or another object.

LoadPropertiesFromHTMLStream is defined as follows:

```
// Parse a string containing HTML attributes and set
//           corresponding properties of punkObject.
// Attributes that are not recognized are returned, unmodified,
//           in bstrNotRecognized.
HRESULT LoadPropertiesFromHTMLStream (
            IUnknown * punkObject,
            IStream * pStream,
            LONG cAttributes,
            HTML_ATTR_DESC * ahtmlattrAttribute,
            BSTR * bstrNotRecognized );
```

Figure 14:
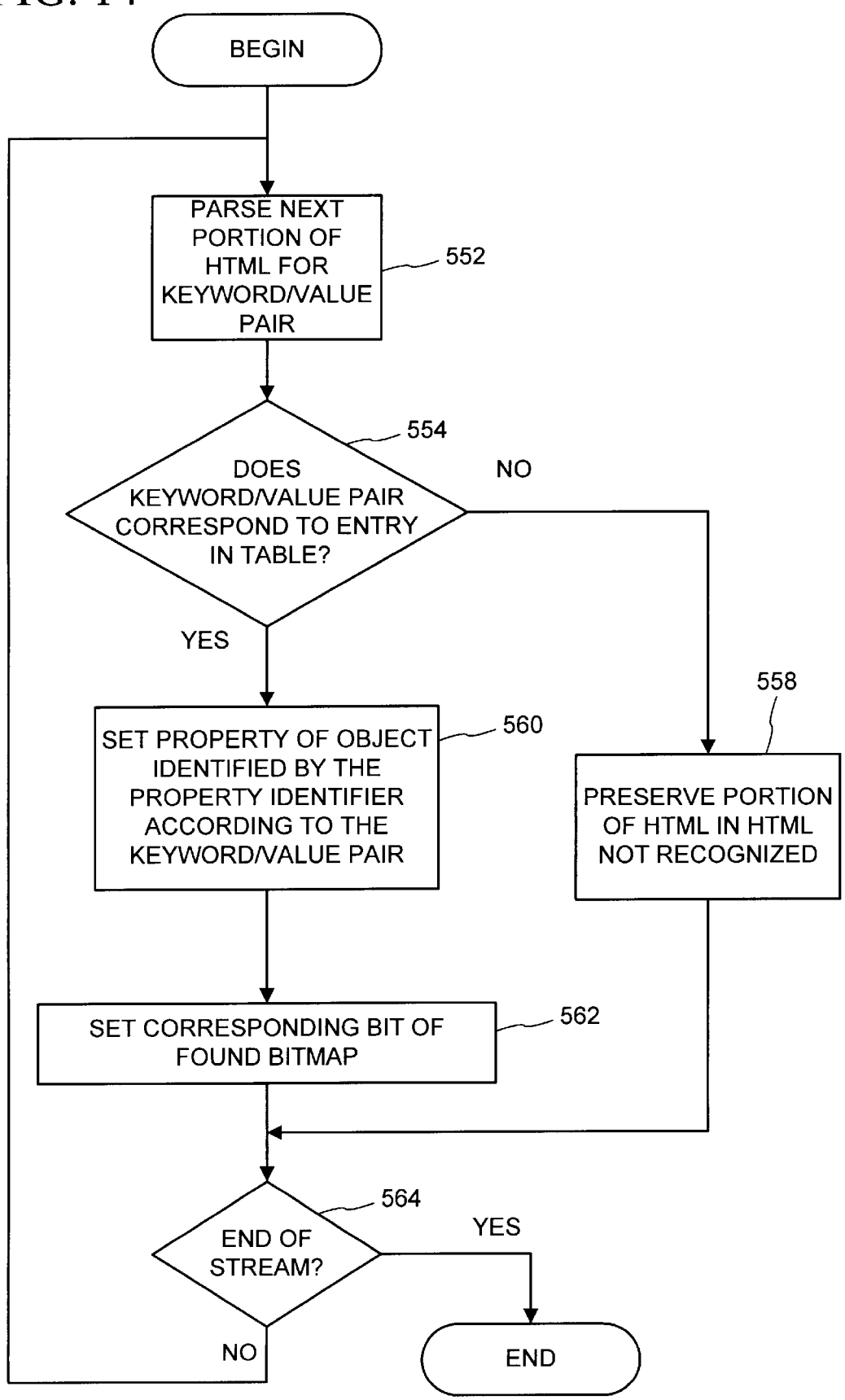
FIG. 14 is a flowchart of a method for setting the properties of the embeddable object shown in FIG. 13 using the Structured Language Attribute-to-Embeddable Object Property Association Table shown in FIG. 13.

LoadPropertiesFromHTMLStream operates according to the following method illustrated at FIG. 14 with reference to FIG. 13. The HTML stream 520 is the stream of HTML associated with the object 504 and is used to set the properties 506 and 508. Typically, only a certain portion of the HTML stream 520 is provided to LoadPropertiesFromHTMLStream. The HTML element name or other HTML tag components may be omitted. At 552, parsing is performed on the certain portion of the HTML stream 520 which results in an HTML attribute keyword 526 and HTML attribute value 528 stored in the temporary location 524. At step 554, the Table 530 is searched for the HTML attribute keyword 526. If there is an entry 534 in the Table 530 with an HTML attribute keyword 536 that matches the HTML attribute keyword 526, the table indicates how to process the temporary location 524. At step 560, the associated DISPID 538 of the entry 534 is used to set a property 506 of the object 504 to a value 512 by using the value 528. Preferably, the value 512 of the property 506 is set using a call to the Invoke member function of the interface IDispatch 514 (IDispatch::Invoke). The call to IDispatch::Invoke specifies the DISPID 538 relating to the property 506, the value 528, and that the value 512 is to be set. At step 562, a bit of the found bitmap 518 is set, indicating that the property 506 was set. If the Table 530 fails to indicate how to process the temporary location 524, the keyword 526 and the value 528 are preserved at step 558 in the HTML not recognized 522, which the object 504 preferably retains for later retrieval.

LoadPropertiesFromHTMLStream operates to properly manipulate any necessary tag delimiters and associations between HTML attributes keywords and their corresponding HTML attribute values. For example, the HTML "INPUT" element of type "RADIO" relating to a radio button presents a special case because the HTML attribute keyword ("CHECKED") does not have a related HTML attribute value (it implicitly has an attribute value of "TRUE"). Also, an HTML "INPUT" element defaults to a type of "TEXT."

Special provisions are made for setting the properties of an ActiveX control relating to an HTML "INPUT" element of type submit or image. Certain information related to the submission of the form is gathered from a location where it was stored previously during the processing of an HTML "FORM" element, as described above.

At step 564, it is determined if the end of the HTML stream 520 has been reached. If so, the method ends. Otherwise, the next portion of the HTML stream 520 is parsed in a further iteration of steps 552–562.

After the properties have been set, the flags 510 are set to indicate that the object 504 relates to HTML and that no changes have been made to it. Various other properties of the object 504 may be set as needed by the document editor. For example, the object may have a name assigned to it by the document editor. This name is assigned in addition to the HTML name as determined during the property setting process described above. The object 504 then has the information it needs to present itself to the user.

Editing the Document

When the document editor controller 404 (FIG. 11) displays the document 402, the user is presented with the option of toggling between a form edit mode and a run mode. During form edit mode, the user may make examine or alter the properties of objects embedded in the document. A change to an object may result in storing a value in its associated flags 510 and the found bitmap 518 to indicate that it has been changed. Similarly, a newly created object may have its flags 510 and found bitmap 518 set accordingly. During run mode, the objects may be operated by the user to perform their functions.

For example, during form edit mode, the user may change the appearance or position of the reset push button. During run mode, the user may click on the reset push button to clear the values in the form associated with it.

An object in a form may need to determine what other objects are located within the same form. For instance, when the user selects one of a set of related radio buttons or clicks on the submit or reset button, information relating to other objects in the form must be retrieved or altered. For example, when the user clicks on a "reset" button, the values in the objects associated within the same form breaks are cleared. Preferably, a function within the document editor searches the document to determine what other objects are located within the same form as a particular object.

Finally, after the HTML document has been converted to the format of the document, the user may save the document (e.g., by using the "File, Save As . . . " command from the Microsoft Word 97 menu bar and specifying native format of Microsoft Word 97, also known as "normal" format). The document editor then writes the document to a location specified by the user using the document editor's native format.

Microsoft Word 97 presents other ways for converting documents from HTML to the native format of Microsoft Word 97. For example, the user may create a new HTML document by using the "File, New . . . " command from the menu bar and specifying a document type of HTML. After entering HTML text into the document, the user may then save the document in Microsoft Word 97 format (i.e., by using the "File, Save As . . . " command of Microsoft Word 97). As another example, the user may choose "View, HTML Source" from the menu bar, and enter HTML text into the HTML source window. When the user switches from the HTML source, the HTML source is converted into Microsoft Word 97 native format. The user may subsequently save the document in Microsoft Word 97's native format. These methods use the above steps to convert the HTML source to an RTF stream and then to associated objects if required.

If an object relates to a form, its class identifier (CLSID) preferably denotes one of the ActiveX controls that are part of Forms³, a set of ActiveX controls provided by Microsoft Corporation. However, HTML elements other than form elements may be converted to ActiveX controls. For instance, an HTML element indicating a background sound or scrolling text (i.e. "MARQUEE") may be converted to an equivalent ActiveX control.

If the C++ programming language is used to represent an ActiveX control, it may be advantageous to use fewer C++ classes than ActiveX control classes. This arrangement avoids having a separate virtual function table for each ActiveX control and is accomplished by using a single C++ class to represent more than one object while changing a property of the class (e.g. a "style" property). This arrangement is also known as aggregating classes.

Overview of Document Native Format to HTML Document Conversion Process

Microsoft Word 97 can convert a Microsoft Word 97 document to an HTML document by performing the methods described below. For example, the user may select the "Save As HTML . . . " command from the menu bar, and the current document is saved as an HTML document. The current document may be a newly created document, a document that has converted according to the methods described above, or a document resulting from some other method.

Figure 15:
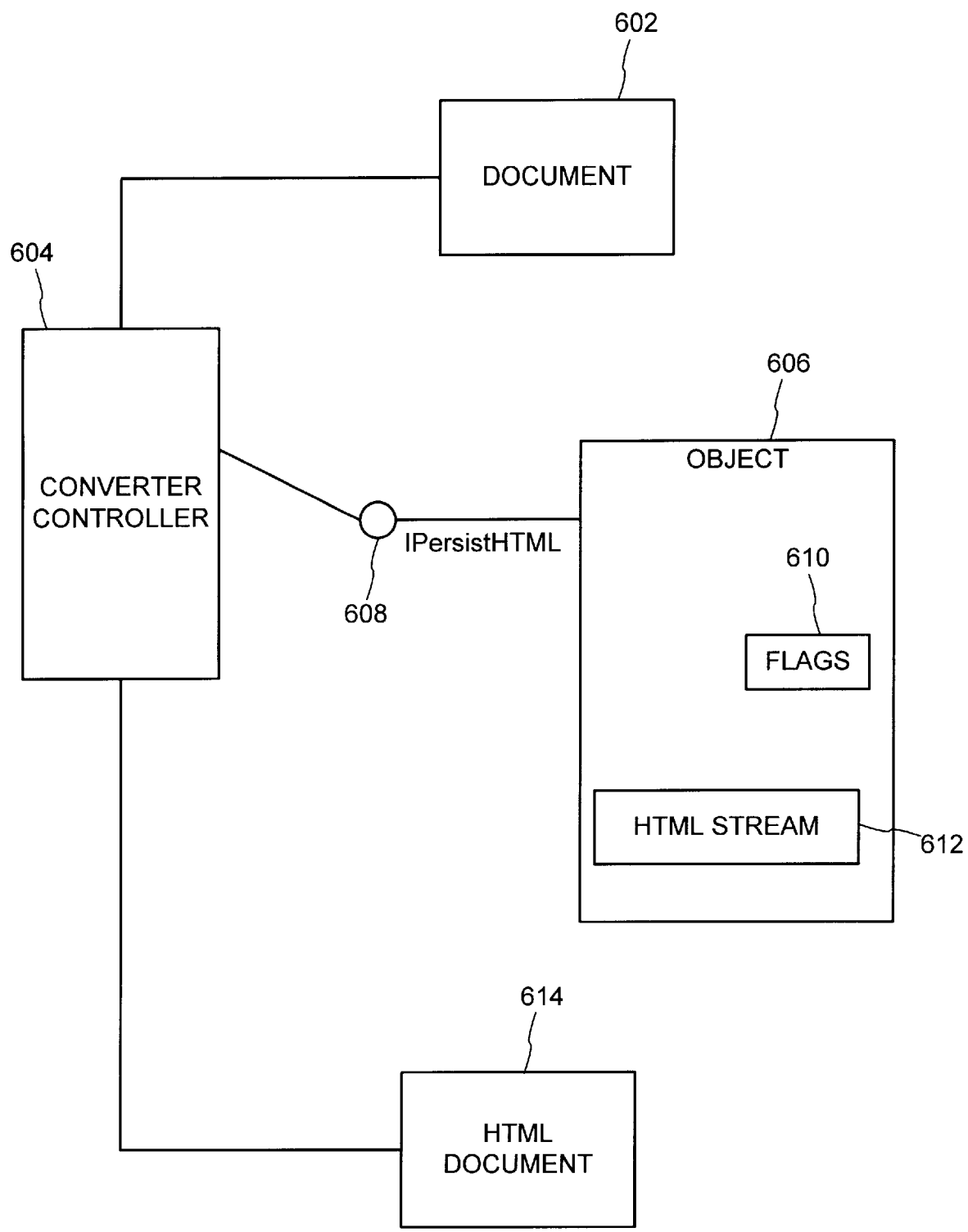
FIG. 15 is a block diagram of document to HTML converter for converting embeddable objects such as the one shown in FIG. 13.
Figure 16:
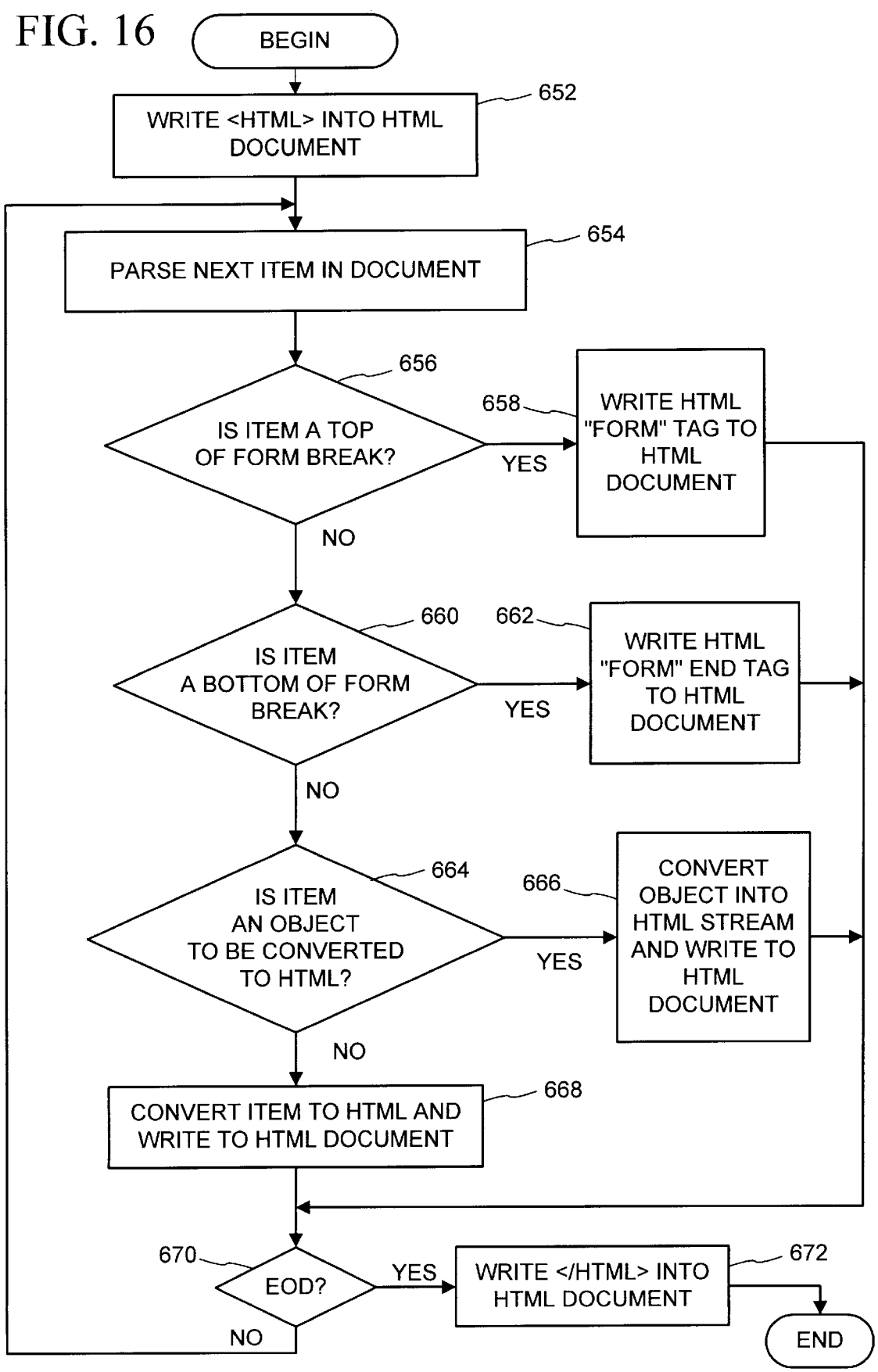
FIG. 16 is a flowchart of a method for converting a document such as that shown in FIG. 15 to an HTML document.

The document to HTML document conversion process is illustrated at FIGS. 15 and 16. A document 602 is converted into an HTML document 614. At step 652, an HTML indicator "<HTML>" is written to the HTML document 614. The conversion process then continues at 654 by parsing the next item in the document 602. At step 656, if the item is determined to be a top of form break, an HTML "FORM" tag is written to the HTML document 614 at step 658. Certain information concerning the "FORM" tag is gathered from the object corresponding to a submit button or image associated with the top of form break. At step 660, if the item is determined to be a bottom of form break, an HTML "/FORM" tag is written to the HTML document 614 at step 662.

At step 664, if the item is an object 606, the flags 610 are examined to determine if it is to be converted to HTML. If so, the object 606 is converted to HTML and written to the HTML document 614 at step 666 using the SaveHTML member function of the IPersistHTML interface 608 (IPersistHTML::SaveHTML). Details concerning step 666 are described below. If the item is a storage representing an uninstantiated object, the HTML can be read out of the HTML stream in the storage and written to the HTML document 614 without instantiating an object.

Otherwise, at step 668, the item is translated to HTML according to well known methods. For example, the Microsoft Word 97 representation of boldface text is converted to the associated HTML tags denoting boldface text ("<B>" and "</B>").

At step 670, it is determined if the end of the document 602 has been reached. If so, the end HTML indicator "</HTML>" is written to the HTML document 614 and the method ends. Otherwise, the document 602 is parsed in a further iteration of steps 654–668.

The conversion process also handles certain additional details of generating HTML, such as the well known specialized "<HEAD>" and "<BODY>" tags. Further, the conversion process writes certain identifying information to the HTML document 614. Many other types of information relating to a variety of HTML tags may be placed in the HTML document 614 as part of the conversion process.

Microsoft Word 97 offers other methods for converting from Microsoft Word 97 native format to HTML. For instance, the user may select "View, HTML Source" from the menu bar to see the HTML source equivalent of the present document. This method uses the above steps, but presents the HTML to the user in a graphical window instead of writing it to an HTML document 614.

Converting an Object Into an HTML Element with IPersistHTML::SaveHTML

Figure 17:
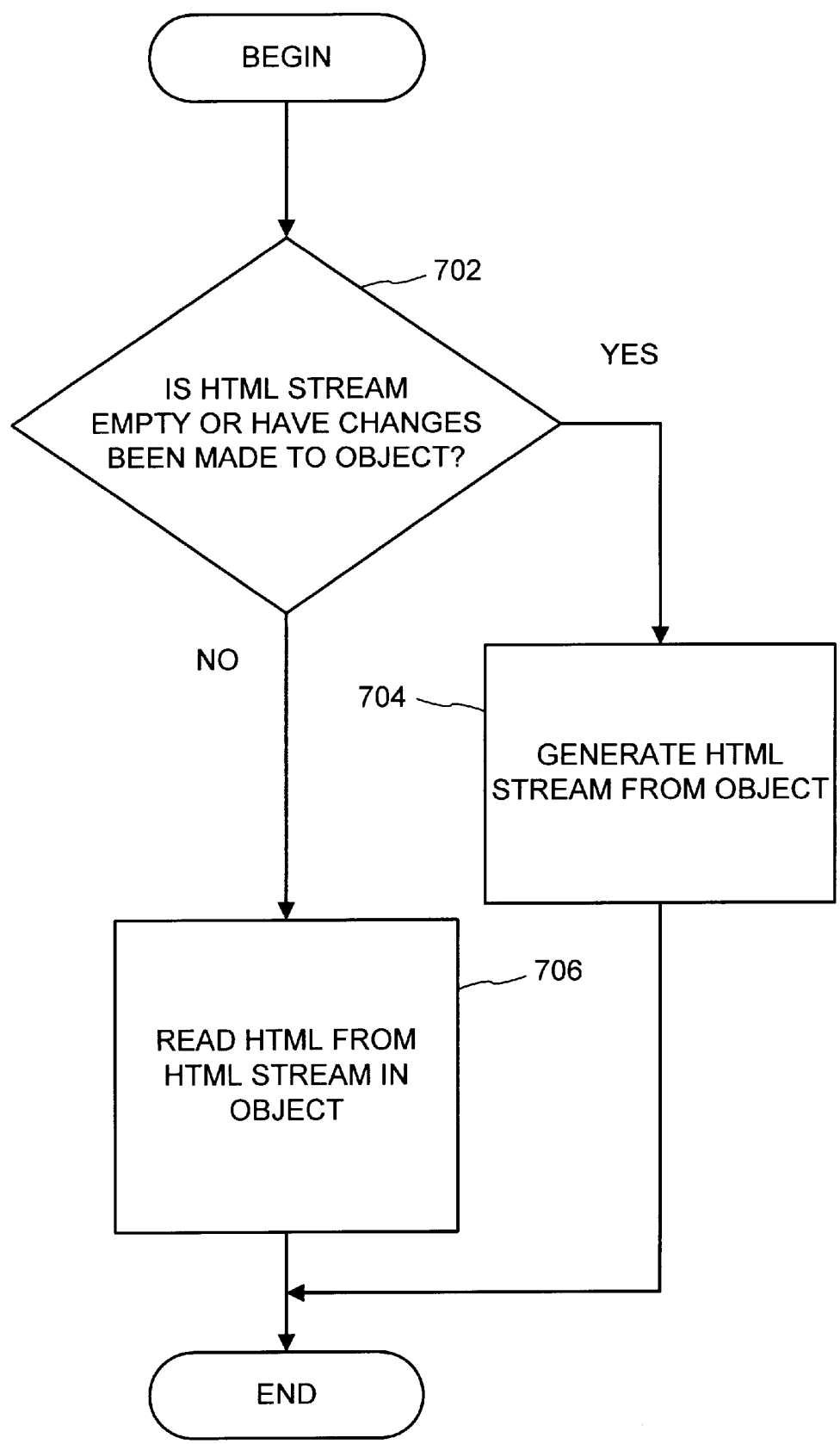
FIG. 17 is a flowchart of a method for converting an embeddable object such as that shown in FIG. 15 to an HTML stream.

Step 666 of the above method performs the following method illustrated by the flowchart at FIG. 17 to convert an object 606 (FIG. 15) to a stream of HTML which is written to the HTML document 614. The method is implemented as a member function SaveHTML of the IPersistHTML interface 608 (IPersistHTML::SaveHTML).

At step 702, the HTML stream 612 is checked to see if it is empty, and the flags 610 are checked to see if they indicate that changes have been made to the object 606. If either condition is true, the method uses a stream of HTML generated from the object 606 at step 704 Otherwise, the method uses the HTML stream 612 from the object 606. Using the HTML stream 612 facilitates the conversion process because no additional conversion logic is required.

Generating a Stream of HTML from the Object

Figure 18:
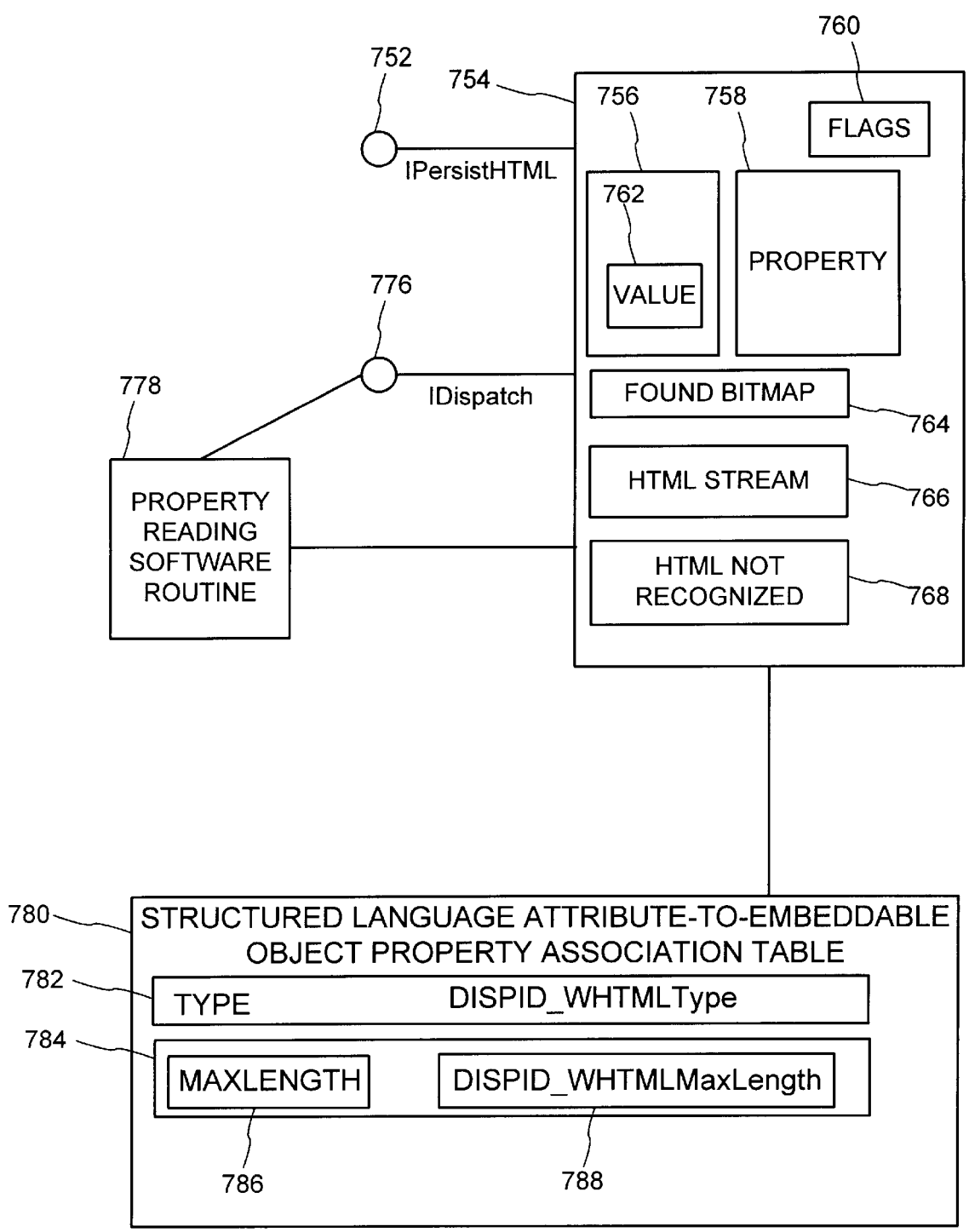
FIG. 18 is a block diagram of an embeddable object such as that shown in FIG. 15, a Structured Language Attribute-to-Embeddable Object Property Association Table and a property saving software routine.
Figure 19:
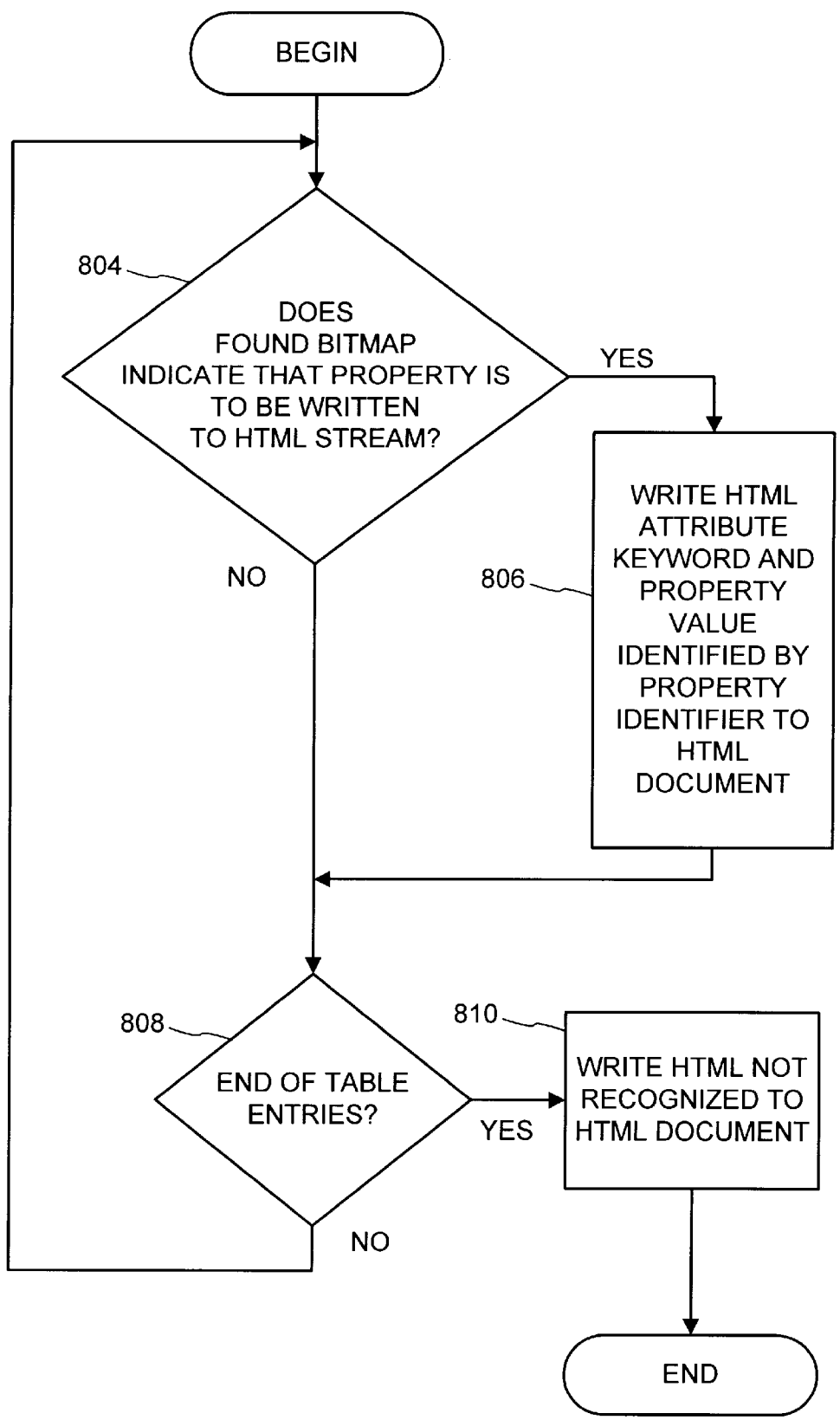
FIG. 19 is a flowchart of a method for producing an HTML stream from the properties of an embeddable object, such as that shown in FIG. 15.

Step 704 includes logic further illustrated at FIGS. 18 and 19. The object 754 is converted to a stream of HTML which is then provided by the IPersistHTML interface 752. Although it is not required, the object 754 preferably uses a property reading software routine 778, SavePropertiesToHTMLStream, to assist in producing the stream of HTML. For example, an ActiveX control relating to scrolling text may first produce the initial part of the stream of HTML, (e.g., <MARQUEE ), call SavePropertiesToHTMLStream to produce another part of the stream of HTML, (e.g., BEHAVIOR="ALTERNATE" WIDTH= "764" HEIGHT="27" GIBBER="important"), and then produce the final part (e.g., >Sample Text</MARQUEE>), resulting in the following stream of HTML:
<MARQUEE BEHAVIOR="ALTERNATE" WIDTH= "764" HEIGHT="27" GIBBER="important">Sample Text</MARQUEE>
The property reading software routine 778 SavePropertiesToHTMLStream is defined as follows:

```
// Get properties of punkObject, convert to an HTML attribute format, save those
// properties plus bstrNotRecognized to the stream.
// Only properties whose corresponding bit is set in dwFound are written.
// (if bit i is set, that means that the attribute described by
//              ahtmlattrAttribute[ i ] is saved.)
HRESULT SavePropertiesToHTMLStream (
           IUnknown * punkObject,
           IStream * pStream,
           LONG cAttributes,
           HTML_ATTR_DESC * ahtmlattrAttribute,
           DMORD * dwFound,
           BSTR bstrNotRecognized );
```

SavePropertiesToHTMLStream uses a Structured Language Attribute-to-Embeddable Object Property Association Table 780. Preferably, this is the same Table 530 (FIG. 13) than can be used with the LoadPropertiesFromHTMLStream property setting software routine 516 described above. The method performed by SavePropertiesToHTMLStream is illustrated at FIG. 19. The method starts at the first entry 782 and proceeds to the last entry 784 in the Table 780.

At step 804, if the found bitmap 764 indicates that the value of the object property identified by the DISPID 788 is to written to the stream of HTML provided by IPersistHTML::SaveHTML, the method proceeds to step 806. At step 806, the HTML attribute keyword 786 and the value 762 of the property 756 identified by the DISPID 788 are written to the stream of HTML provided by the IPersistHTML interface 752. Preferably, the value 762 of the property 756 is read from the object 754 by using a call to the Invoke member function of the interface IDispatch 776 (IDispatch::Invoke) that specifies the DISPID 788 relating to the property 756, and that the value 762 is to be read.

Ordinarily, the HTML attribute keyword 786 is followed by a "=" character, and then a text representation of the value 762 of the property 756 in quotations follows, for example:
    MAXLENGTH="25"
If it is determined at step 808 that there are no more entries in the table, the HTML not recognized 768 is provided by IPersistHTML::SaveHTML (for the HTML document 614), and the method ends. Otherwise, the next entry in the Table 780 is considered in a further iteration of steps 804–806.

The process operates to properly handle special cases such as the radio button, described above. The process also ensures that HTML tag delimiters are written into appropriate locations in the stream of HTML provided by the IPersistHTML interface 752. The details of writing the properties may be varied. For example, quotations around the text representation of the value 762 (e.g., "25") may be omitted.

Microsoft Word 97 can convert ActiveX controls other than those corresponding to HTML form elements into HTML. For example, an ActiveX control representing scrolling text can be converted into an HTML "MARQUEE" element. Similarly, Microsoft Word 97 implements conversion of video and background sounds.

The IPersistHTML Interface

To load an HTML element from or save an HTML element to an ActiveX control, Microsoft Word 97 uses the IPersistHTML Interface. The IPersistHTML Interface is related to the well known IPersistStreamInit interface, except that the persisted state of the object is HTML. IPersistHTML provides IPersistHTML::SaveHTML, which generates a stream of HTML sufficient for the object to restore its present state and IPersistHTML::LoadHTML, which, given a stream of HTML, restores the object to a prior state. The streams written or read by these methods are streams comprising HTML. It should be noted that an exact equivalence between an HTML element and an ActiveX control may not be achieved, so some state information may be lost or slightly modified. The present invention addresses this problem by retaining the original HTML used to generate the ActiveX control and retaining any HTML not recognized by the ActiveX control. The HTML not recognized may be later retrieved when the ActiveX control produces a stream of HTML. The IPersistHTML interface uses Unicode, a well known format for representing characters. However, some other format for representing characters (e.g., ASCII) could be used.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A computer-implemented method for converting a structured language element representing an element to be rendered within a document to a data structure representing a software object of a software object class having a method for setting properties of the software object based on a passed structured language element, the method comprising:

reading the structured language element representing the element to be rendered within the document;

determining a class identifier associated with the structured language element representing the element to be rendered within the document and indicative of the software object class having a method for setting properties of the software object based on a passed structured language element; and without instantiating an instance of the represented software object of the software object class, converting the structured language element representing the element to be rendered within the document to the data structure representing the software object of the software object class having a method for setting properties of the software object based on a passed structured language element, the data structure containing the persistent state of the represented object of the software object class, wherein the data structure comprises the class identifier associated with the structure language element representing the element to be rendered within the document and indicative of the software object class having a method for setting properties of the software object based on a passed structured language element.

2. The method of claim 1 wherein the structured language element has a tag name indicating characteristics of a visible element in the document and wherein determining the class identifier associated with the structured language element comprises:

finding a class identifier associated with the tag name of the structured language element, wherein the class identifier identifies a software object class providing the characteristics of the visible element indicated by the tag name.

3. The method of claim 2 wherein the class identifier identifies a software object class embeddable and editable in a converted document edited by a document editor.

4. The method of claim 1 wherein the data structure further comprises the structured language element.

5. The method of claim 1 wherein the data structure comprises the structured language element, the method further comprising:

instantiating an instance of an object identified by the class identifier;

locating the structured language element in the data structure; and setting the properties of the instance of the object by passing the located structured language element to the method for setting properties of the software object based on the passed structured language element.

6. The method of claim 5 wherein the structured language element comprises and HTML attribute keyword and an associated HTML attribute value and the setting comprises:

matching the HTML attribute keyword with an object property identifier identifying a property of the object;

setting the property identified by the object property identifier to a value according to the associated HTML attribute value.

7. A method for converting a structured language element to a data structure representing a software object, the method comprising:

reading the structured language element;

converting the structured language element to the data structure representing the software object without instantiating an instance of the represented software object, the represented software object being of a software object class having a method defined to set properties of the represented software object based on the data structure representing the software object.

8. The method of claim 7 wherein the data structure representing a software object comprises a class identifier chosen according to the following method:

selecting a structured language tag component of the structured language element; and finding the structured language tag component in an entry of a data structure associating the structured language tag component with the class identifier.

9. A method of converting a software object to a structured language element, wherein the software object represents an original structured language element comprising a portion of structured language not recognized when creating the software object, and the software object comprises the portion of structured language not recognized when creating the software object, the method comprising: reading the portion of structured language not recognized when creating the software object; and reconstituting the original structured language element from the software object to produce the converted structured language element, including in the converted structured language element the portion of structured language not recognized when creating the software object.

10. The method of claim 9 wherein the converted structured language element is a form element representing an original structured language element that is a form element.

11. A method for converting a data structure representing a represented software object to a structured language element, wherein the data structure was created without creating an instance of the represented software object and comprises text of the structured language element, the method comprising:

reconstituting the structured language element of the represented software object by reading the text of the structured language element stored in the data structure without instantiating the represented software object.

12. A method for converting a software object to a structured language element, the method comprising:

providing a data structure to a software routine extrinsic to the software object, the data structure with entries associating a structured language attribute keyword with a property identifier, the software routine performing the following for a plurality of entries in the data structure:

reading a has-been-set value in the software object indicative of whether a property value of the software object identified by the property identifier in the entry has been set; and if the has-been-set value is indicative of having set the property value, producing a portion of the structured language element comprising the structured language attribute keyword in the entry and the property value identified by the property identifier.

13. The method of claim 12 wherein the structured language attribute keyword is an HTML attribute keyword and the property identifier is an integer value.

14. A converter for converting a structured language element to an embeddable data structure representing a represented object, the converter comprising:

a parser operative for selecting a tag component of the structured language element;

a data structure with an entry, the entry associating a structured language tag component with an object class identifier;

a table look-up logic operative for selecting a class identifier associated in the data structure with the selected tag component; and a structured language element data structure logic operative for creating a data structure comprising the structured language element and the class identifier to generate an embeddable representation of the represented object without instantiating an instance of the represented object.

15. A computer-implemented method for converting an HTML element representing an HTML form user interface feature to a data structure representing a software object for depicting a form user interface feature corresponding to the HTML form user interface feature in a document editor, the represented software object being of a software object class having a method for setting properties of the represented software object when supplied with an HTML element, the method comprising:

reading the HTML element representing the HTML form user interface feature;

determining a class identifier associated with the HTML form user interface feature and indicative of the software object class having a method for setting properties of the represented software object when supplied with an HTML element;

without instantiating an instance of the represented software object of the software object class, converting the HTML element to the data structure representing the software object for depicting the form user interface feature corresponding to the HTML form user interface feature in the document editor, the data structure comprising the persistent state of the represented object of the software object class, wherein the data structure comprises the class identifier associated with the HTML form user interface feature and indicative of the software object class having a method for setting properties of the represented software object when supplied with an HTML element.

16. The method of claim 15 wherein the data structure further comprises the HTML element.

17. The method of claim 15 wherein the HTML element representing an HTML form user interface feature comprises a tag name; and the determining determines the class identifier by determining the class identifier is associated with the tag name.

* * * * *

UNITED STATES PATENT AND TRADEMARK OFFICE
CERTIFICATE OF CORRECTION

PATENT NO. : 6,182,092 B1
DATED : January 30, 2001
INVENTOR(S) : Francis et al.

It is certified that error appears in the above-identified patent and that said Letters Patent is hereby corrected as shown below:

Column 9,
Line 57, "of an the" should be -- of the --.

Column 10,
Line 67, "placed the form." should be -- placed in the form. --.

Column 23,
Line 3, "704 Otherwise" should be -- 704. Otherwise --.
Line 40, "DMORD" should be -- DWORD --.
Lines 52-53, "is to written" should be -- is to be written --.

Column 25, claim 6,
Line 66, "and" should be -- an --.

Signed and Sealed this

Fourth Day of December, 2001

Attest:

*Attesting Officer*

NICHOLAS P. GODICI
*Acting Director of the United States Patent and Trademark Office*